US012149029B2

(12) United States Patent
Buck et al.

(10) Patent No.: US 12,149,029 B2
(45) Date of Patent: Nov. 19, 2024

(54) ELECTRICAL CONNECTOR SYSTEM

(71) Applicant: SAMTEC, INC., New Albany, IN (US)

(72) Inventors: Jonathan E. Buck, New Albany, IN (US); John Mongold, New Albany, IN (US)

(73) Assignee: SAMTEC, INC., New Albany, IN (US)

(*) Notice: Subject to any disclaimer, the term of this patent is extended or adjusted under 35 U.S.C. 154(b) by 0 days.

(21) Appl. No.: 18/304,775

(22) Filed: Apr. 21, 2023

(65) Prior Publication Data

US 2023/0253737 A1 Aug. 10, 2023

Related U.S. Application Data

(63) Continuation of application No. 16/622,668, filed as application No. PCT/US2018/037198 on Jun. 13, 2018, now Pat. No. 11,637,400.

(Continued)

(51) Int. Cl.

| | |
|---|---|
| ***H01R 13/6461*** | (2011.01) |
| ***H01R 12/71*** | (2011.01) |
| ***H01R 12/73*** | (2011.01) |
| ***H01R 13/04*** | (2006.01) |
| ***H01R 13/11*** | (2006.01) |
| ***H01R 24/20*** | (2011.01) |
| ***H01R 24/28*** | (2011.01) |
| *H01R 107/00* | (2006.01) |

(52) U.S. Cl.

CPC ....... *H01R 13/6461* (2013.01); *H01R 12/716* (2013.01); *H01R 12/73* (2013.01); *H01R 13/04* (2013.01); *H01R 13/113* (2013.01); *H01R 24/20* (2013.01); *H01R 24/28* (2013.01); *H01R 2107/00* (2013.01)

(58) Field of Classification Search

CPC .. H01R 13/6461; H01R 13/04; H01R 13/113; H01R 12/716; H01R 12/73; H01R 24/20; H01R 24/28; H01R 2107/00

See application file for complete search history.

(56) References Cited

U.S. PATENT DOCUMENTS

| | | |
|---|---|---|
| 3,329,926 A | 7/1967 | Akin et al. |
| 4,158,745 A | 6/1979 | Keller |

(Continued)

FOREIGN PATENT DOCUMENTS

| | | |
|---|---|---|
| CN | 1467884 A | 1/2004 |
| CN | 2749117 Y | 12/2005 |

(Continued)

OTHER PUBLICATIONS

"Cable Assemblies/BiPass I/O/High-Speed Solutions", Molex, LLC., © 2018, 3 pages.

(Continued)

*Primary Examiner* — Abdullah A Riyami
*Assistant Examiner* — Nader J Alhawamdeh
(74) *Attorney, Agent, or Firm* — Baker Hostetler

(57) ABSTRACT

An orthogonal electrical connector system includes vertical electrical connectors that are configured to e mated to each other so as to place respective pluralities of first and second substrates that are oriented orthogonal to each other in data communication with each other through the mated electrical connectors. Other connector systems are also disclosed.

23 Claims, 12 Drawing Sheets

Related U.S. Application Data

(60) Provisional application No. 62/524,360, filed on Jun. 23, 2017, provisional application No. 62/518,867, filed on Jun. 13, 2017.

(56) References Cited

U.S. PATENT DOCUMENTS

| | | | | |
|---|---|---|---|---|
| 4,621,885 | A | 11/1986 | Szczesny et al. | |
| D315,331 | S | 3/1991 | Yamamoto | |
| D316,704 | S | 5/1991 | Eto et al. | |
| D316,846 | S | 5/1991 | Moriai et al. | |
| D323,646 | S | 2/1992 | Suzuki et al. | |
| D327,469 | S | 6/1992 | Moriai et al. | |
| D328,590 | S | 8/1992 | Tanaka | |
| 5,228,871 | A | 7/1993 | Goodman | |
| 5,340,329 | A | 8/1994 | Hirai | |
| 5,486,117 | A | 1/1996 | Chang | |
| 5,713,752 | A | 2/1998 | Leong et al. | |
| 5,741,150 | A | 4/1998 | Stinson et al. | |
| 5,919,063 | A | 7/1999 | Wang | |
| 5,951,340 | A | 9/1999 | Mueller et al. | |
| D419,135 | S | 1/2000 | Wu et al. | |
| 6,146,205 | A | 11/2000 | Lai | |
| D435,245 | S | 12/2000 | Hwang | |
| D435,831 | S | 1/2001 | Ko | |
| 6,176,716 | B1 | 1/2001 | Mercurio et al. | |
| 6,217,365 | B1 | 4/2001 | Shinozaki | |
| D449,276 | S | 10/2001 | Hwang et al. | |
| 6,409,543 | B1 | 6/2002 | Astbury et al. | |
| D459,702 | S | 7/2002 | Watanabe | |
| 6,462,957 | B1 | 10/2002 | Kwong et al. | |
| 6,491,529 | B2 | 12/2002 | Gray et al. | |
| 6,565,383 | B1 | 5/2003 | Wu | |
| 6,652,318 | B1 | 11/2003 | Winings et al. | |
| D483,329 | S | 12/2003 | Kuo | |
| 6,655,979 | B1 | 12/2003 | Lee | |
| D485,532 | S | 1/2004 | Lai | |
| D490,377 | S | 5/2004 | Sato | |
| 6,736,663 | B2 | 5/2004 | Lee et al. | |
| 6,799,986 | B2 | 10/2004 | Igarashi et al. | |
| 6,848,932 | B2 | 2/2005 | Bowling et al. | |
| 6,860,750 | B1 | 3/2005 | Wu | |
| 6,890,205 | B1 | 5/2005 | Wu | |
| 6,945,796 | B2 | 9/2005 | Bassler et al. | |
| 6,951,474 | B1 | 10/2005 | Wu | |
| 6,981,883 | B2 * | 1/2006 | Raistrick ............ | H01R 13/6471 439/74 |
| 6,991,487 | B2 | 1/2006 | Wu | |
| 7,083,459 | B1 | 8/2006 | Wu et al. | |
| D539,746 | S | 4/2007 | Lee | |
| 7,226,307 | B1 | 6/2007 | Chen et al. | |
| D550,617 | S | 9/2007 | Wang | |
| D562,246 | S | 2/2008 | Matsuzaki et al. | |
| D576,954 | S | 9/2008 | Hsiao | |
| 7,422,494 | B2 | 9/2008 | Fry et al. | |
| 7,473,124 | B1 | 1/2009 | Briant et al. | |
| 7,581,978 | B1 | 9/2009 | Briant | |
| D601,506 | S | 10/2009 | Fukazawa et al. | |
| D605,602 | S | 12/2009 | Mase | |
| D606,941 | S | 12/2009 | Satoshi | |
| 7,628,636 | B2 | 12/2009 | Yu et al. | |
| 7,666,023 | B2 | 2/2010 | Wu | |
| 7,686,622 | B2 | 3/2010 | Dawiedczyk et al. | |
| 7,794,262 | B2 | 9/2010 | Briant et al. | |
| 7,837,522 | B1 | 11/2010 | Hoover et al. | |
| 7,841,889 | B2 | 11/2010 | Gerard et al. | |
| D631,016 | S | 1/2011 | Ijima et al. | |
| D640,638 | S | 6/2011 | Ngo | |
| D649,518 | S | 11/2011 | Zhu | |
| D650,754 | S | 12/2011 | Bodmann et al. | |
| 8,075,332 | B2 | 12/2011 | Amidon | |
| 8,231,400 | B2 | 7/2012 | Phillips et al. | |
| 8,282,430 | B2 | 10/2012 | He et al. | |
| 8,348,701 | B1 | 1/2013 | Lan et al. | |
| 8,398,429 | B2 | 3/2013 | Costello | |
| 8,475,197 | B2 | 7/2013 | Zerebilov et al. | |
| 8,506,323 | B2 | 8/2013 | Costello | |
| 8,545,254 | B2 | 10/2013 | Amidon | |
| 8,591,248 | B2 | 11/2013 | Pepe et al. | |
| D699,683 | S | 2/2014 | Yoshisuji | |
| D706,724 | S | 6/2014 | McCartin et al. | |
| D708,580 | S | 7/2014 | McCartin et al. | |
| 8,888,529 | B2 | 11/2014 | Buck et al. | |
| 8,888,530 | B2 | 11/2014 | Trout et al. | |
| 8,998,645 | B2 | 4/2015 | Vanaleck et al. | |
| D729,745 | S | 5/2015 | Vanderwoud | |
| 9,052,473 | B2 | 6/2015 | Schmelz et al. | |
| D745,852 | S | 12/2015 | Harper et al. | |
| 9,209,545 | B2 | 12/2015 | Hemmi et al. | |
| D748,589 | S | 2/2016 | Endo et al. | |
| 9,257,778 | B2 * | 2/2016 | Buck .................... | H01R 13/516 |
| 9,293,852 | B2 | 3/2016 | Glick et al. | |
| 9,356,373 | B2 | 5/2016 | Komoto et al. | |
| 9,385,479 | B1 | 7/2016 | Schmitt et al. | |
| D768,089 | S | 10/2016 | Liu | |
| D772,168 | S | 11/2016 | Harper et al. | |
| 9,608,348 | B2 | 3/2017 | Wanha | |
| D801,283 | S | 10/2017 | Walsh et al. | |
| D816,044 | S | 4/2018 | Zerebilov et al. | |
| 9,985,367 | B2 | 5/2018 | Wahna et al. | |
| D823,814 | S | 7/2018 | Buck et al. | |
| 10,020,614 | B1 | 7/2018 | Bucher | |
| D826,863 | S | 8/2018 | Schafmeister | |
| D835,046 | S | 12/2018 | Bingham | |
| 10,199,768 | B2 | 2/2019 | Nagasaki | |
| 10,230,196 | B2 | 3/2019 | Phillips et al. | |
| 10,439,330 | B2 | 10/2019 | Mongold et al. | |
| 10,534,145 | B2 | 1/2020 | Zbinden et al. | |
| 10,574,002 | B1 | 2/2020 | Henry et al. | |
| D877,084 | S | 3/2020 | Buck et al. | |
| D877,700 | S | 3/2020 | Buck et al. | |
| D879,724 | S | 3/2020 | Buck et al. | |
| D881,133 | S | 4/2020 | Buck et al. | |
| D896,183 | S | 9/2020 | Musser et al. | |
| D924,169 | S | 7/2021 | Buck et al. | |
| D940,663 | S | 1/2022 | Musser et al. | |
| D941,779 | S | 1/2022 | Buck et al. | |
| D941,780 | S | 1/2022 | Buck et al. | |
| D964,291 | S | 9/2022 | Faith et al. | |
| D995,443 | S | 8/2023 | Yamazaki et al. | |
| D1,005,964 | S | 11/2023 | Faith et al. | |
| 11,843,193 | B2 | 12/2023 | Kitagawa | |
| D1,024,967 | S | 4/2024 | Musser et al. | |
| 2001/0003077 | A1 | 6/2001 | Van Woensel | |
| 2001/0044235 | A1 | 11/2001 | Cohen | |
| 2003/0143886 | A1 | 7/2003 | Nemoto | |
| 2003/0194889 | A1 | 10/2003 | Golat et al. | |
| 2003/0228788 | A1 | 12/2003 | Igarashi et al. | |
| 2004/0115983 | A1 | 6/2004 | Liang | |
| 2004/0121633 | A1 | 6/2004 | David et al. | |
| 2004/0248446 | A1 | 12/2004 | Kuroki | |
| 2005/0101176 | A1 | 5/2005 | Kachlic | |
| 2005/0148219 | A1 | 7/2005 | Myer et al. | |
| 2006/0094281 | A1 | 5/2006 | Dang | |
| 2007/0155255 | A1 | 7/2007 | Galauner et al. | |
| 2007/0281543 | A1 | 12/2007 | Boegelein et al. | |
| 2008/0102702 | A1 | 5/2008 | Sercu et al. | |
| 2008/0166090 | A1 | 7/2008 | Kiani et al. | |
| 2008/0305690 | A1 | 12/2008 | Zhang et al. | |
| 2009/0201658 | A1 | 8/2009 | Lemke et al. | |
| 2009/0215309 | A1 | 8/2009 | Mongold et al. | |
| 2009/0233492 | A1 | 9/2009 | Mizukami et al. | |
| 2009/0291584 | A1 | 11/2009 | Wu | |
| 2010/0178779 | A1 | 7/2010 | Davis et al. | |
| 2010/0203765 | A1 * | 8/2010 | Goossens ........... | H01R 13/6461 439/626 |
| 2010/0240233 | A1 | 9/2010 | Johnescu et al. | |
| 2010/0255731 | A1 | 10/2010 | Oyake et al. | |
| 2011/0009011 | A1 | 1/2011 | Johnescu et al. | |
| 2011/0294357 | A1 | 12/2011 | Tanaka | |
| 2011/0300736 | A1 | 12/2011 | Katagiri et al. | |
| 2012/0058665 | A1 | 3/2012 | Zerebilov et al. | |
| 2012/0329305 | A1 | 12/2012 | Ritter et al. | |
| 2013/0004120 | A1 | 1/2013 | Zbinden et al. | |

(56) References Cited

U.S. PATENT DOCUMENTS

| | | | | |
|---|---|---|---|---|
| 2013/0023157 | A1 | 1/2013 | Orner | |
| 2013/0115815 | A1 | 5/2013 | Lim et al. | |
| 2013/0273781 | A1* | 10/2013 | Buck | H01R 13/6471 439/626 |
| 2014/0038447 | A1 | 2/2014 | Brown et al. | |
| 2014/0065899 | A1 | 3/2014 | Aboulkassem et al. | |
| 2014/0213125 | A1 | 7/2014 | Hemmi et al. | |
| 2014/0220795 | A1 | 8/2014 | Bai et al. | |
| 2014/0242817 | A1 | 8/2014 | Mongold et al. | |
| 2014/0273670 | A1 | 9/2014 | Crutcher | |
| 2014/0295680 | A1 | 10/2014 | Yuqiang et al. | |
| 2014/0335707 | A1 | 11/2014 | Johnescu et al. | |
| 2015/0079845 | A1* | 3/2015 | Wanha | H01R 13/6477 439/607.41 |
| 2015/0255895 | A1 | 9/2015 | Knowlden et al. | |
| 2016/0006150 | A1 | 1/2016 | Bachmutsky | |
| 2016/0109668 | A1* | 4/2016 | Pfnuer | G02B 6/4257 438/26 |
| 2016/0111824 | A1* | 4/2016 | Phillips | H01R 24/60 439/607.05 |
| 2016/0149341 | A1 | 5/2016 | Reed | |
| 2016/0149730 | A1* | 5/2016 | Navid | H04L 25/4917 375/233 |
| 2016/0164196 | A1 | 6/2016 | Wu et al. | |
| 2016/0233598 | A1 | 8/2016 | Wittig | |
| 2016/0261060 | A1* | 9/2016 | Sechrist | H04Q 1/06 |
| 2016/0308309 | A1 | 10/2016 | Stokoe et al. | |
| 2017/0077621 | A1 | 3/2017 | Liao | |
| 2017/0170604 | A1 | 6/2017 | Endo et al. | |
| 2017/0187158 | A1 | 6/2017 | Crowe | |
| 2017/0229792 | A1 | 8/2017 | Wu et al. | |
| 2017/0310029 | A1 | 10/2017 | Lee et al. | |
| 2017/0357060 | A1 | 12/2017 | Jones | |
| 2018/0054012 | A1 | 2/2018 | Zhu et al. | |
| 2018/0076581 | A1 | 3/2018 | Tsai et al. | |
| 2018/0131144 | A1 | 5/2018 | Xing et al. | |
| 2018/0294592 | A1 | 10/2018 | Huang et al. | |
| 2019/0013619 | A1 | 1/2019 | Obata et al. | |
| 2019/0044287 | A1 | 2/2019 | Lin et al. | |
| 2019/0051587 | A1* | 2/2019 | Azeroual | H01L 21/4857 |
| 2019/0089098 | A1 | 3/2019 | Cheng et al. | |
| 2019/0089106 | A1 | 3/2019 | Regnier | |
| 2019/0097357 | A1 | 3/2019 | Mongold | |
| 2019/0131743 | A1 | 5/2019 | Hsu et al. | |
| 2019/0393634 | A1 | 12/2019 | Kao et al. | |
| 2020/0044395 | A1 | 2/2020 | Naganuma et al. | |
| 2020/0212631 | A1* | 7/2020 | Buck | H01R 12/73 |
| 2020/0220279 | A1 | 7/2020 | Koellmann et al. | |
| 2020/0350731 | A1 | 11/2020 | Buck et al. | |
| 2021/0151934 | A1 | 5/2021 | Faith | |

FOREIGN PATENT DOCUMENTS

| | | | |
|---|---|---|---|
| CN | 200950498 | Y | 9/2007 |
| CN | 101171724 | A | 4/2008 |
| CN | 201117955 | Y | 9/2008 |
| CN | 101297441 | A | 10/2008 |
| CN | 201570699 | U | 9/2010 |
| CN | 201789145 | U | 4/2011 |
| CN | 102222828 | A | 10/2011 |
| CN | 301785292 | S | 1/2012 |
| CN | 102356520 | A | 2/2012 |
| CN | 103828129 | A | 5/2014 |
| CN | 104103931 | A | 10/2014 |
| CN | 303032002 | S | 12/2014 |
| CN | 104332767 | A | 2/2015 |
| CN | 105703157 | A | 6/2016 |
| CN | 106207534 | A | 12/2016 |
| EP | 1225664 | A2 | 7/2002 |
| JP | 60-007258 | | 2/1985 |
| JP | 05-021110 | A | 1/1993 |
| JP | 0985825 | | 12/1995 |
| JP | 09-085825 | A | 3/1997 |
| JP | 2003-503824 | A | 1/2003 |
| JP | 1206569 | | 4/2004 |
| JP | 2004-192939 | A | 7/2004 |
| JP | 2009-218119 | A | 9/2009 |
| JP | 1419110 | S | 7/2011 |
| JP | 2013-524479 | A | 6/2013 |
| JP | 5940898 | B2 | 6/2016 |
| JP | 2017-027942 | A | 2/2017 |
| JP | 2017-037851 | A | 2/2017 |
| JP | 2018-014964 | A | 2/2018 |
| JP | 1655265 | S | 3/2020 |
| JP | 1655173 | S | 8/2020 |
| KR | 0193346 | | 2/1997 |
| KR | 10-0193346 | B1 | 6/1999 |
| KR | 10-2001-0024513 | A | 3/2001 |
| KR | 20-2009-0006701 | U | 7/2009 |
| TW | 404579 | U | 9/2000 |
| TW | M328112 | U | 3/2008 |
| TW | D130799 | | 10/2008 |
| TW | D132453 | S1 | 12/2009 |
| TW | D163315 | | 9/2013 |
| TW | D172197 | | 4/2014 |
| TW | D166670 | | 3/2015 |
| TW | D168325 | | 6/2015 |
| TW | D168328 | | 6/2015 |
| TW | M519836 | U | 4/2016 |
| TW | D184085 | | 7/2017 |
| TW | D186804 | | 11/2017 |
| TW | D198418 | S | 7/2019 |
| WO | 2013/155147 | A1 | 10/2013 |
| WO | 2015/116407 | A1 | 8/2015 |
| WO | 2017/218771 | | 12/2017 |
| WO | 2018/231896 | A1 | 12/2018 |
| WO | 2019/018728 | A1 | 1/2019 |
| WO | 2019/084110 | A1 | 5/2019 |

OTHER PUBLICATIONS

"Credo demonstrates 112 G PAM4 SR, 56G PAM4 LR, and 56G NRZ Serdes Technology at DesignCon", Credo Semiconductor, Jan. 30, 2017, 6 pages.

Amphenol TCS, "PAL 4x8 POS, 30AWG, 40GHz CBL ASSY", Part No. HS30720-XXX, Drawing No. CHS30720500, dated Oct. 31, 2017, 3 pages.

Buck et al., "Contact Wafer", U.S. Appl. No. 29/611,655, filed Jul. 14, 2017.

Buck et al., "Contact Wafer", U.S. Appl. No. 29/647,260, filed May 11, 2018.

Buck et al., "Contact Wafer", U.S. Appl. No. 29/647,260, filed May 11, 2018., U.S. Appl. No. 29/647,260.

Buck et al., "Contact Wafers", U.S. Appl. No. 29/652,017, filed Dec. 20, 2018.

Buck et al., "Contact Wafers", U.S. Appl. No. 29/652,017, filed Dec. 20, 2018., U.S. Appl. No. 29/652,017.

Buck et al., "Electrical Connector System", International Application No. PCT/US2018/037198, filed Jun. 13, 2018.

Buck et al., "Electrical Connector", U.S. Appl. No. 29/610,936, filed Jul. 17, 2017.

Buck et al., "Electrical Connector", U.S. Appl. No. 29/610,936, filed Jul. 17, 2017, U.S. Appl. No. 29/610,936.

Buck et al., "Electrical Connector", U.S. Appl. No. 29/611,028, filed Jul. 18, 2017.

Buck et al., "Right-Angle Electrical Connector and Electrical Contacts for a Right Angle Connector", International Application No. PCT/US2018/057266 filed Oct. 24, 2018.

Contact Wafer, U.S. Appl. No. 29/647,260.

Contact Wafers, U.S. Appl. No. 29/652,017.

Electrical Connector, U.S. Appl. No. 29/610,936.

Electrical Connector, U.S. Appl. No. 29/611,028.

Faith, et al.; "Electrical Connector Having Latch"; International Application No. PCT/US2018/043025 filed Jul. 20, 2018.

Gannon, "TE Connectivity introduces cabled STRADA Whisper connectors", Aug. 23, 2017, pp. 1-7, https://www.connectortips.com/te-connectivity-introduces-cabled-strada-whisper-connectors/.

Har-bus Connectors, p. 5, (JPO Division of Design, Official Gazette Known Data No. HD13004493), Halting KGaA, Acceptance Date—Mar. 16, 2001.

(56) References Cited

OTHER PUBLICATIONS

Har-bus Connectors, p. 5, (JPO Division of Design, Official Gazette Known Data No. HD13004493), Harting KGaA, Acceptance Date—Mar. 16, 2001.
Har-bus Connectors, p. 5, (JPO Division of Design, Official Gazette Known Data No. HD13004494), Halting KGaA, Acceptance Date—Mar. 16, 2001.
Har-bus Connectors, p. 5, (JPO Division of Design, Official Gazette Known Data No. HD13004494), Harting KGaA, Acceptance Date—Mar. 16, 2001.
Mongold et al., "Overmolded Lead Frame Providing Contact Support and Impedance Matching Properties", U.S. Appl. No. 15/566,504, filed Oct. 13, 2017.
Samtec, Examax Backplane Cable, Drawing No. EBCM-X-4-XX-X-X-X-XX-X-XX-X, Revision F, Jun. 2, 2017, 7 pages.
Samtec, Examax Backplane Cable, Drawing No. EBCM-X-6-XX-X-X-X-XX-X-XX-X, Revision F, Apr. 10, 2017, 7 pages.
TE Connectivity introduces cabled STRADA Whisper connectors, Connector Tips, https://www.connectortips.com/te-connectivity-introduces-cabled-strada-whisper-connectors/, website accessed Jul. 20, 2020.
TE Connectivity introduces cabled STRADA Whisper connectors, Connector Tips, https://www.connectortips.com/te-connectivity-introduces-cabled-strada-whisper-connectors/, website accessed Jul. 20, 2020, 8 pages.

* cited by examiner

ELECTRICAL CONNECTOR SYSTEM

CROSS-REFERENCE TO RELATED APPLICATIONS

This is a continuation of U.S. patent application Ser. No. 16/622,668 filed Dec. 13, 2019, which is the US National Stage of PCT/US2018/037198 filed Jun. 13, 2018, which claims priority to U.S. Patent Application Ser. No. 62/518,867 filed Jun. 13, 2017 and U.S. Patent Application Ser. No. 62/524,360 filed Jun. 23, 2017, the disclosure of each of which is hereby incorporated by reference as if set forth in its entirety herein.

BACKGROUND

Electrical connectors include electrical contacts that mount to respective electrical components, and mate with each other to communicate signals between the electrical components. The electrical contacts typically include electrical signal contacts that carry the signals, and grounds that shield the various signal contacts from each other. Nevertheless, the signal contacts are so closely spaced that undesirable interference, or "cross talk," occurs between adjacent signal contacts. Cross talk occurs when one signal contact induces electrical interference in an adjacent signal contact due to intermingling electrical fields, thereby compromising signal integrity. With electronic device miniaturization and high speed, high signal integrity electronic communications becoming more prevalent, the reduction of cross talk becomes a significant factor in connector design.

In orthogonal applications, the electrical components are substrates, such as printed circuit boards, that are oriented along orthogonal planes. In conventional orthogonal systems, the electrical connectors are right-angle connectors having mounting interfaces that are oriented orthogonal to each other. The mounting interfaces mount to the respective substrates. Unfortunately, data transfer speeds in conventional orthogonal electrical connector systems are limited in order to avoid prohibitive crosstalk levels.

What is desired is an orthogonal electrical connector system capable of operating at higher data transfer speeds within acceptable levels of cross talk.

SUMMARY

In accordance with one aspect of the present disclosure, an orthogonal electrical connector system can include a first substrate and a second substrate. The system can further include a first electrical connector having an electrically insulative first connector housing and a plurality of first vertical electrical contacts supported by the first connector housing. The first vertical electrical contacts can define respective first mating ends and respective first mounting ends opposite the first mating ends. The system can further include a second electrical connector having an electrically insulative second connector housing and a plurality of second plurality of electrical contacts supported by the second connector housing. The second vertical electrical contacts can define respective second mating ends and respective second mounting ends opposite the second mating ends. When the first electrical connector is attached to the first substrate, and the second electrical connector is attached to the second substrate, the first and second electrical connectors are configured to mate to each other such that the first substrate is oriented along a first plane, and the second substrate is oriented along a second plane that is substantially orthogonal to the first plane.

DETAILED DESCRIPTION

Figure 1A:
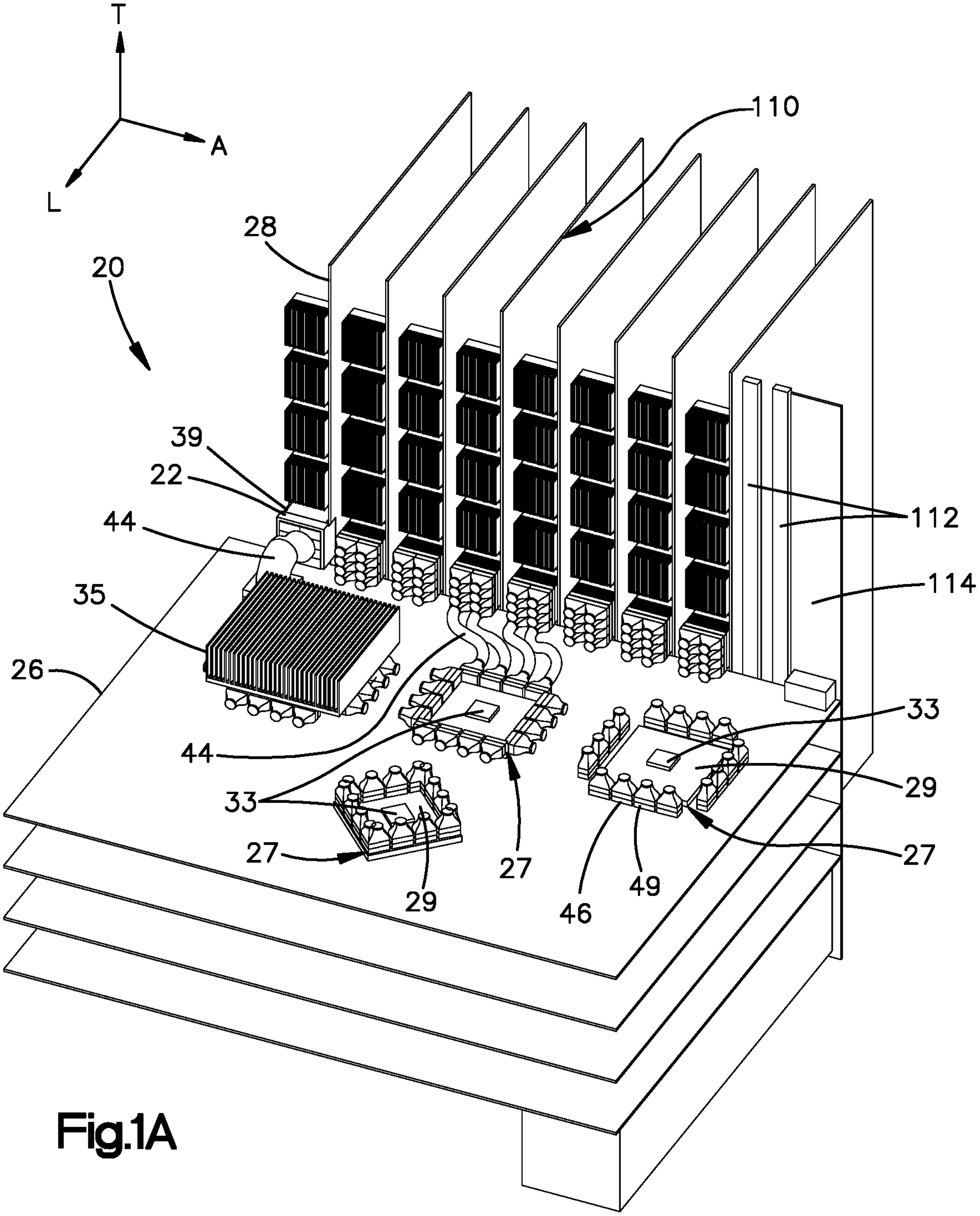
FIG. 1A is a perspective view of a portion of an orthogonal electrical connector system constructed in accordance with one embodiment.

Referring to FIGS. 1A-1D, an orthogonal electrical connector system 20 constructed in accordance with one embodiment includes at least one first electrical connector 22 and a complementary at least one second electrical connector 24. The orthogonal electrical connector system 20 further includes at least one first substrate 26 such as a plurality of first substrates 26. The orthogonal electrical connector system 20 further includes at least one second substrate 28 such as a plurality of second substrates 28. The first and second substrates 26 can be configured as printed circuit boards. The first electrical connectors 22 can be configured to attach to respective ones of the first substrates

26. The second electrical connectors 24 can be configured to attach to respective ones of the second substrates 28. When the first electrical connectors 22 are attached to the first substrates 26, and the second electrical connectors 24 are attached to the second substrates 28, the first and second electrical connectors 22 and 24 are configured to mate to each other such that the first substrates 26 are oriented along respective first planes, and the second substrates 28 are oriented along respective second planes that are substantially orthogonal to the first planes. Further, respective edges of the first substrates 26 can face respective edges of the second substrates along a longitudinal direction L. Unless otherwise indicated, the term "substantially" recognizes tolerances that can be due, for instance, to manufacturing.

Figure 1B:
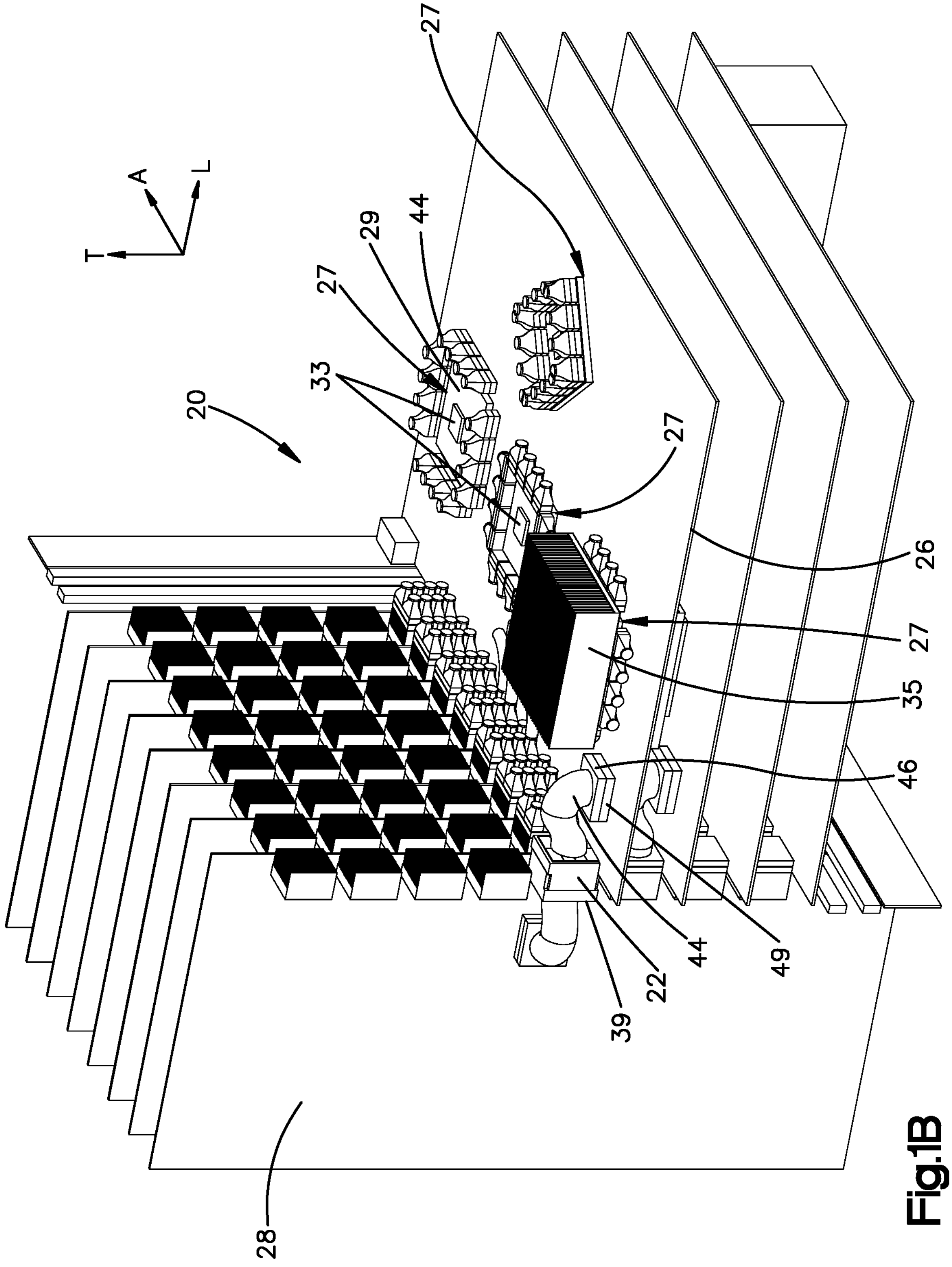
FIG. 1B is another perspective view of a portion of the orthogonal electrical connector system illustrated in FIG. 1A.
Figure 1C:
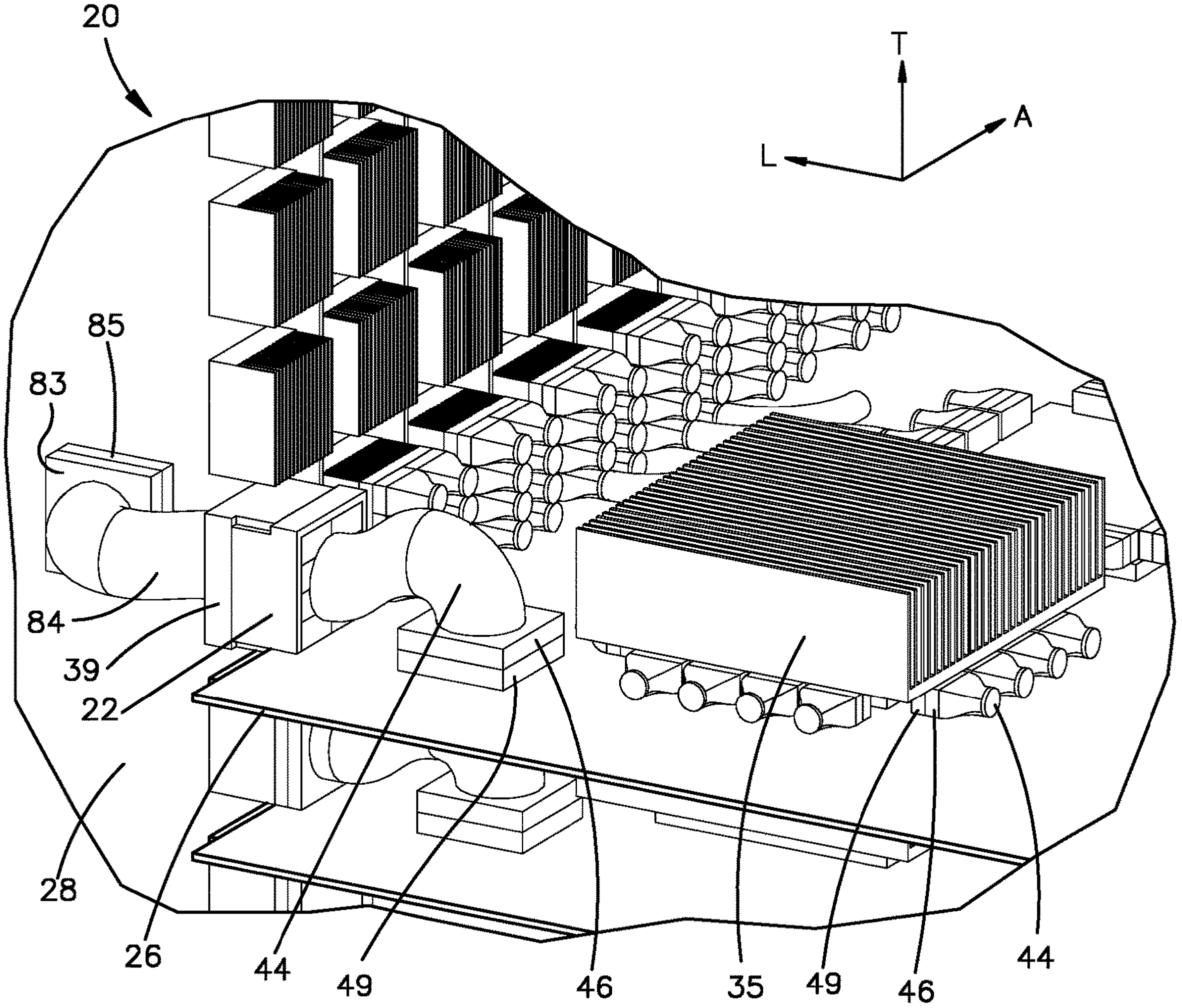
FIG. 1C is an enlarged perspective view of a portion of the orthogonal electrical connector system illustrated in FIG. 1A.
Figure 1D:
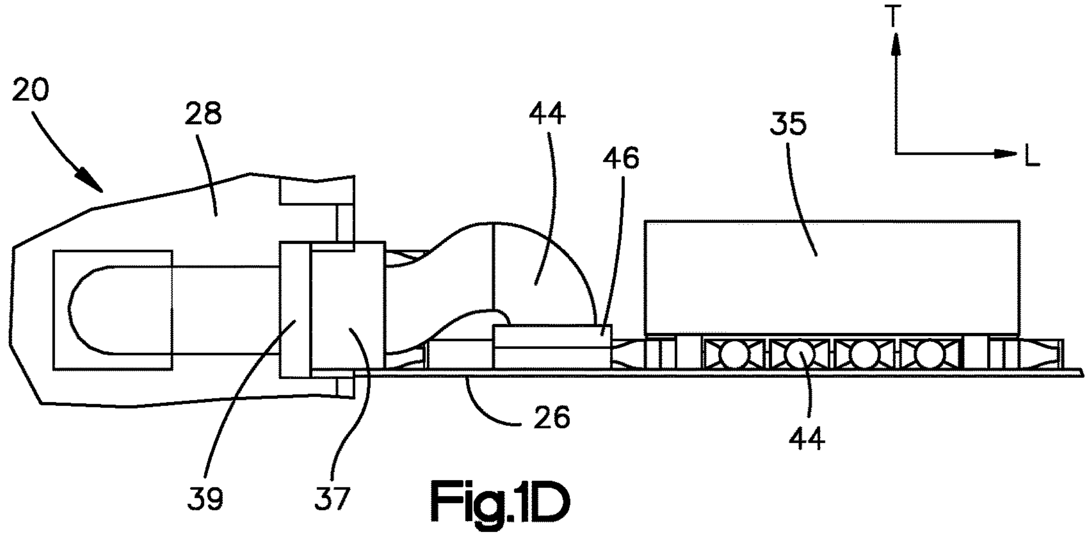
FIG. 1D is a side elevation view of a portion of the orthogonal electrical connector system illustrated in FIG. 1A.
Figure 2A:
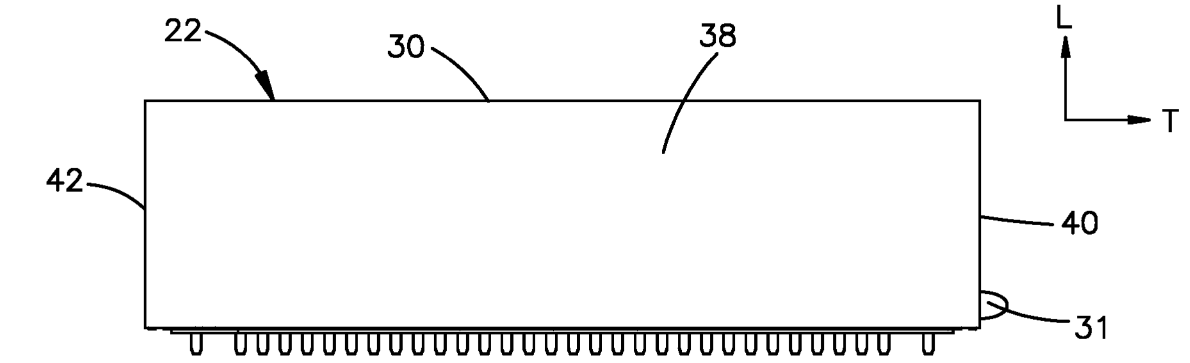
FIG. 2A is a side elevation view of a portion of a first electrical connector of the orthogonal electrical connector system illustrated in FIG. 1A.
Figure 2B:
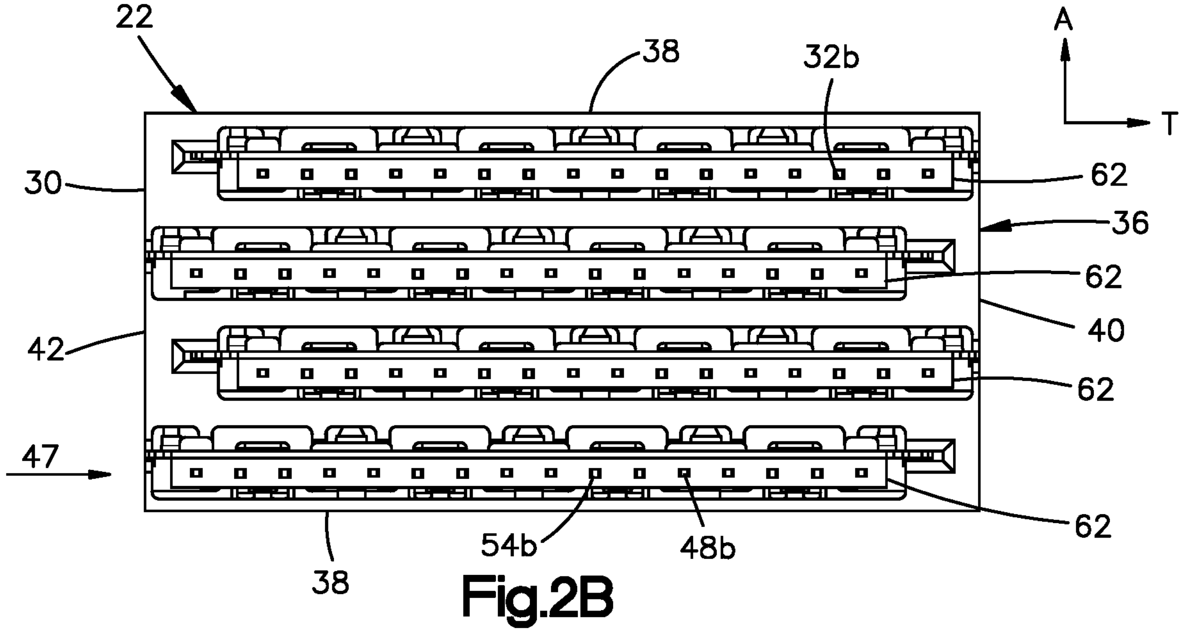
FIG. 2B is a rear elevation view of the first electrical connector illustrated in FIG. 2A.
Figure 2C:
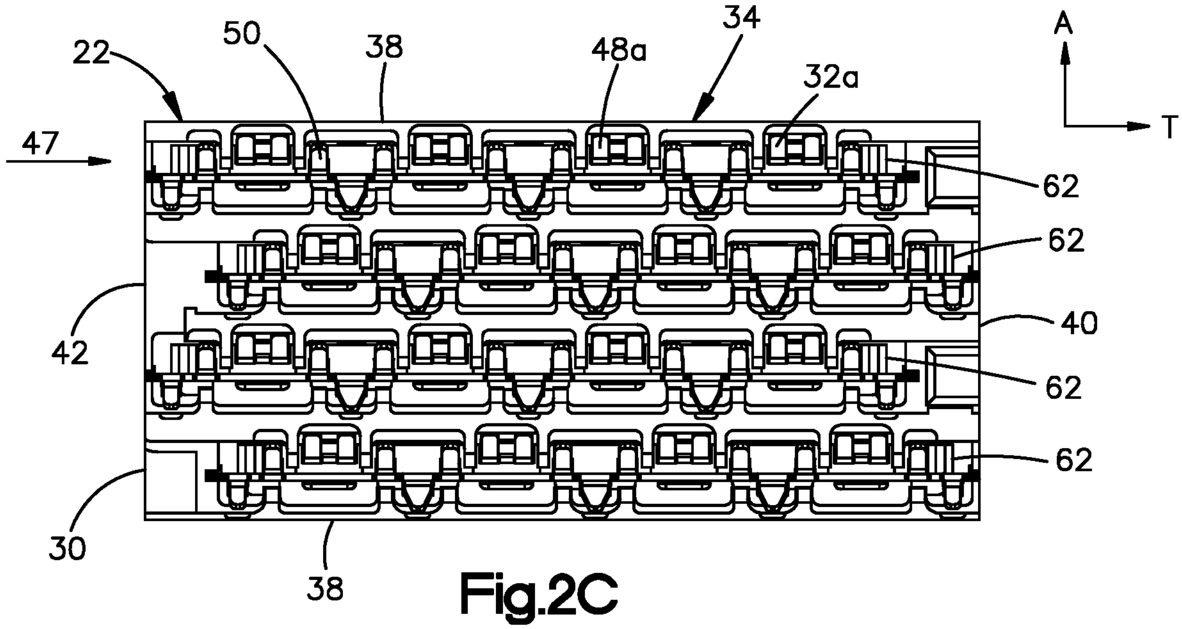
FIG. 2C is a front elevation view of a portion of a first electrical connector illustrated in FIG. 2A.
Figure 2D:
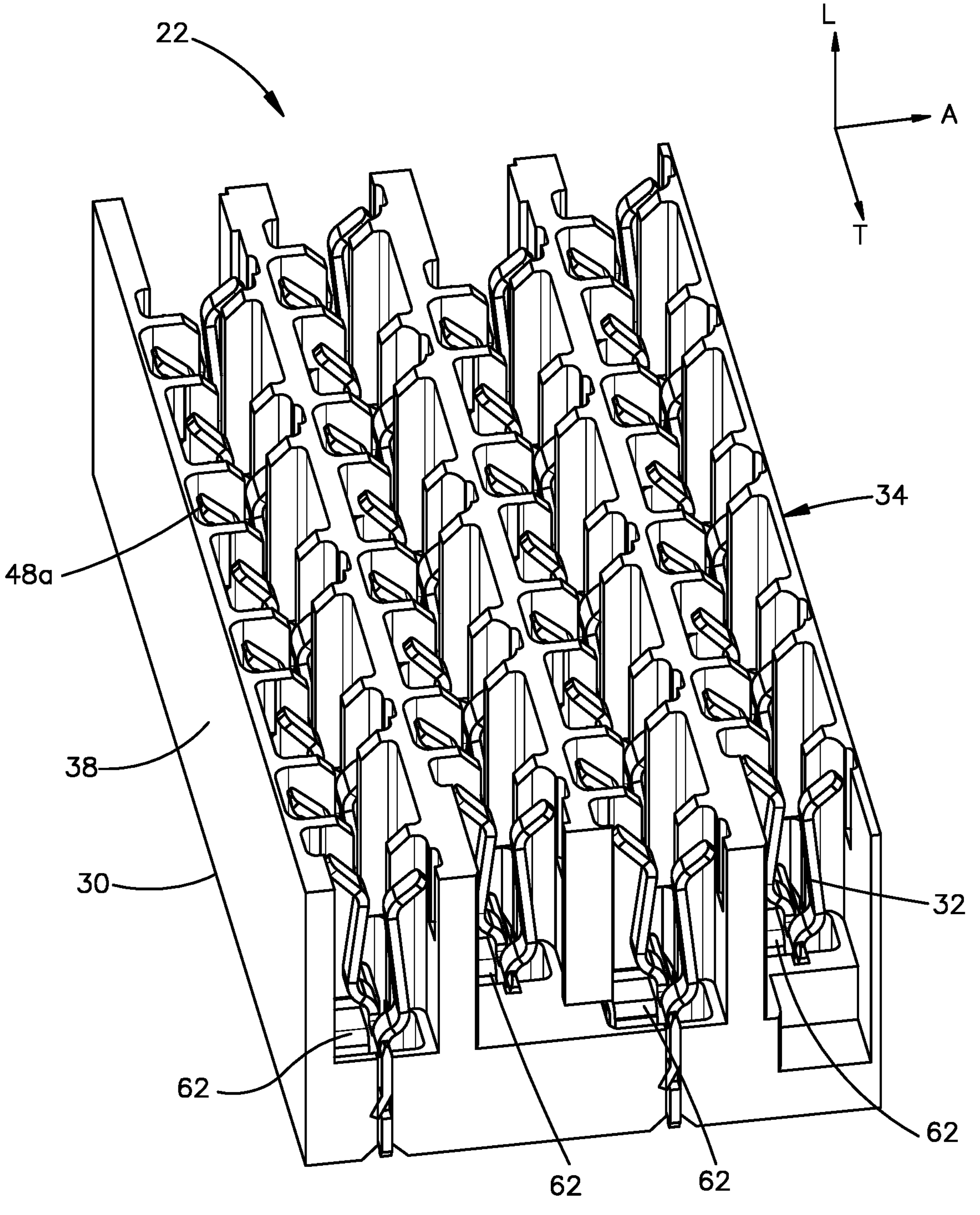
FIG. 2D is a front perspective view of the first electrical connector illustrated in FIG. 2A.
Figure 2E:
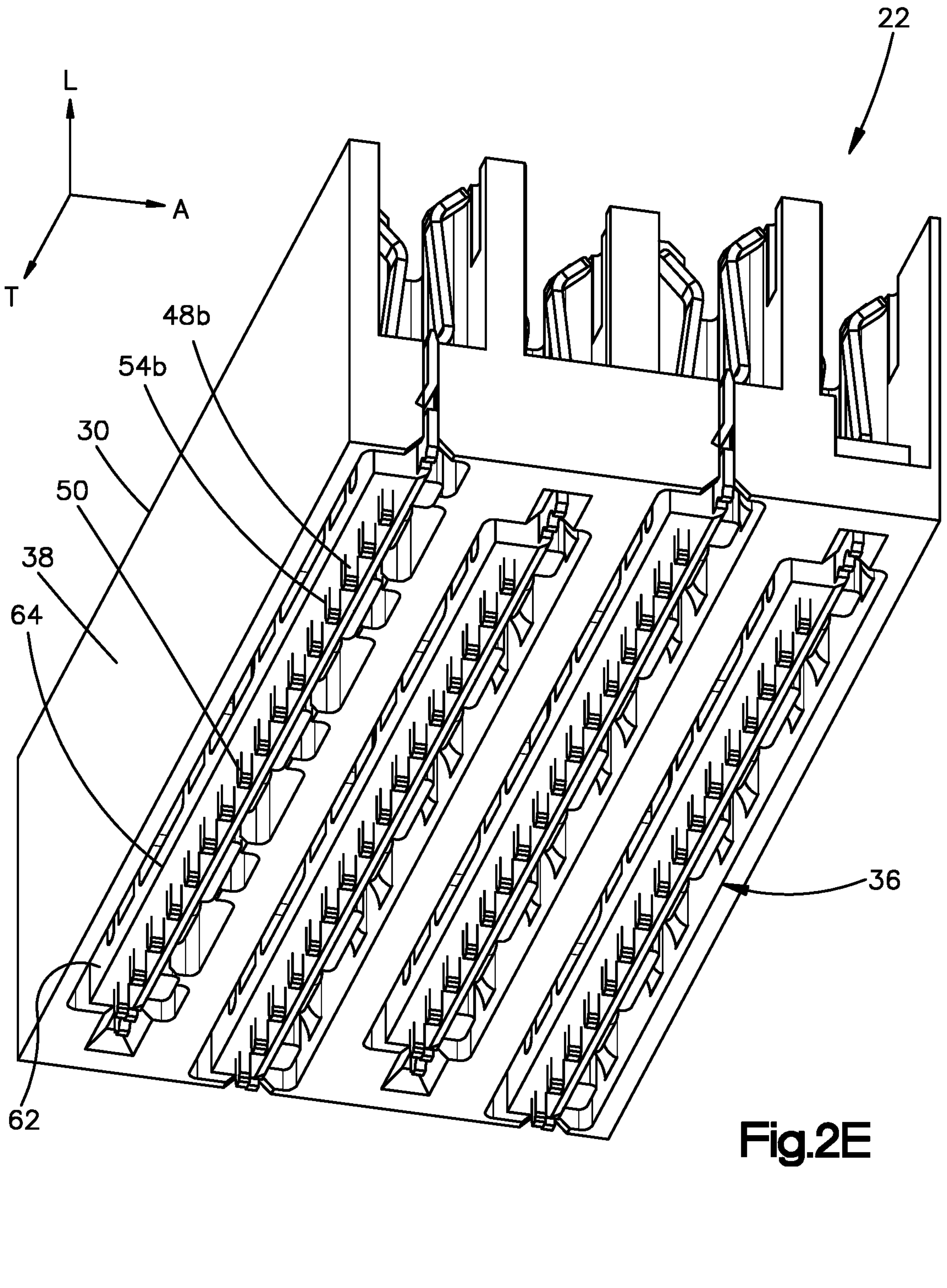
FIG. 2E is a rear perspective view of the first electrical connector illustrated in FIG. 2A.
Figure 2F:
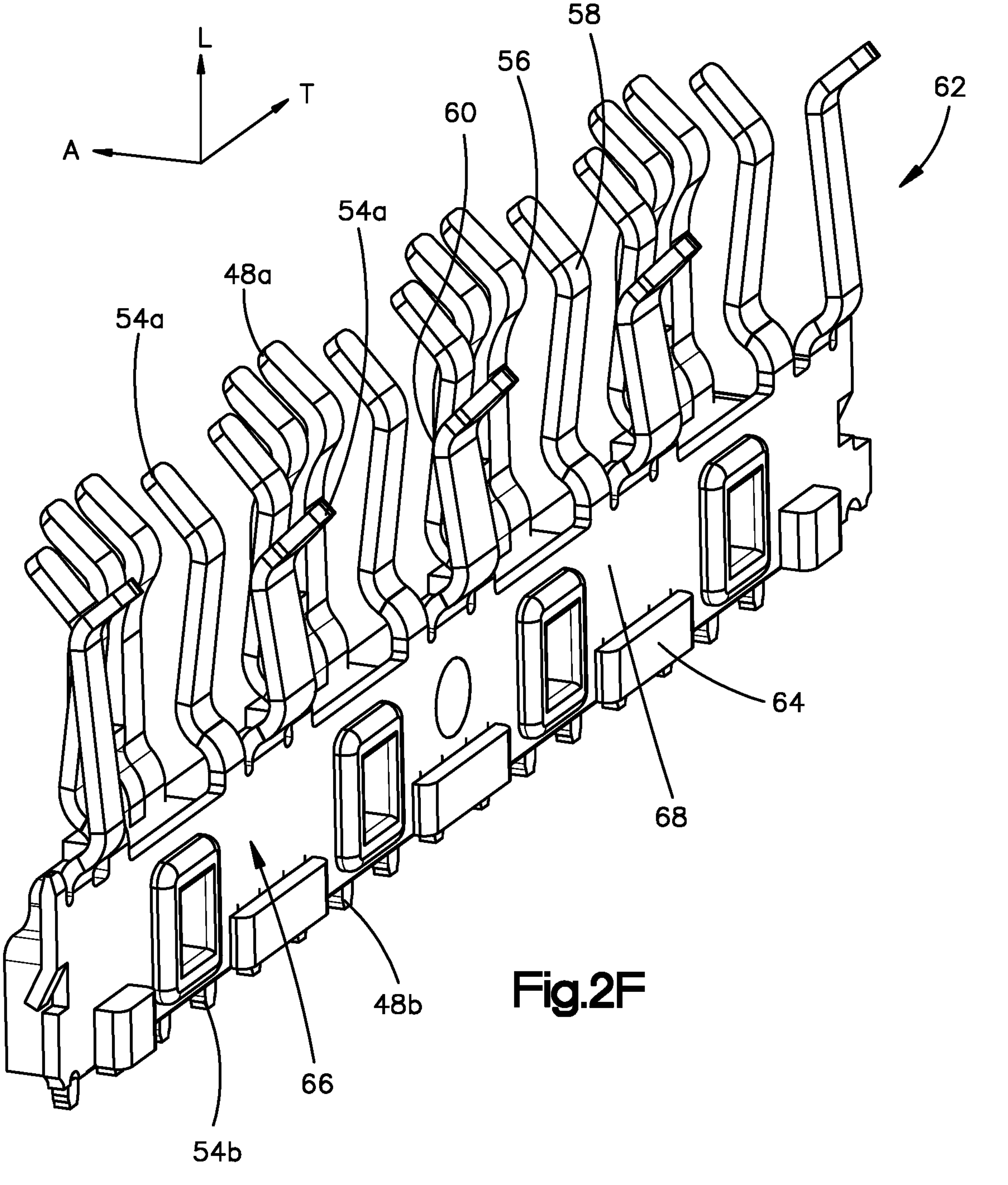
FIG. 2F is a perspective view of a leadframe assembly of the first electrical connector illustrated in FIG. 2A.

In one example, the orthogonal connector system 20 can include first arrays 23 of first electrical connectors 22 that are each configured to be placed in electrical communication with a common one of the first substrates 26. Similarly, the orthogonal connector system 20 can include second arrays 25 of second electrical connectors 24 (see FIG. 3D) that are each configured to be placed in electrical communication with a common one of the second substrates 28. Each of the first arrays 23 can further include a respective first outer housing 37, such that the first electrical connectors of each of the first arrays 23 is supported by the first outer housing 37. In particular, the first outer housing 37 can surround the first electrical connectors 22 of the respective first array 23. Similarly, each of the second arrays 25 can further include a respective second outer housing 39, such that the second electrical connectors 24 of each of the second arrays 25 is supported by the second outer housing 39. In particular, the second outer housing 39 can surround the second electrical connectors 24 of the respective second array 25. In FIGS. 1A-1C, some of the outer housings 37 and 39 are shown removed for illustration purposes. It should also be appreciated that in other examples, the first and second electrical connectors 22 and 24 can be attached directly to the respective first and second substrates 26 and 28.

Thus, in one example, the first outer housing 37 can include at least one first attachment member that is configured to attach the first outer housing 37 to the first substrate 26. In this regard, the first outer housing 37 can be said to attach the respective first electrical connectors 22 of the first array 23 to the first substrate 26. Thus, the first electrical connectors 22 can be configured to attach to the first substrate via the first outer housing 37. Similarly, the second outer housing 39 can include at least one respective second attachment member that tis configured to attach the second outer housing 39 to the second substrate 28. In this regard, the second outer housing 39 can be said to attach the respective second electrical connectors 24 of the second array 25 to the second substrate 28. Thus, the second electrical connectors 24 can be configured to attach to the second substrate 28 via the second outer housing 39. The first and second outer housings 37 and 39 can be configured to interlock with each other so as to cause the respective first electrical connectors 22 to mate with respective ones of the second electrical connectors 24. In one example, the first and second outer housings 37 and 39 can be substantially identical to each other. Thus, it should be appreciated that the first and second outer housings 37 and 39 can be hermaphroditic with respect to each other. The first and second outer housings 37 and 39 can be electrically insulative.

In another example, the first electrical connectors 22 can be configured to attach directly to the first substrate 26, as is described in more detail below. Similarly, the second electrical connectors 24 can be configured to attach to the second substrate 28, as is described in more detail below.

As will now be described, because the first and second electrical connectors 22 and 24 are each configured as a vertical electrical connector, the respective electrical contacts define shorter distances from their respective mating ends to their respective mounting ends compared to right-angle electrical connectors of conventional orthogonal electrical connector systems. As a result, the first and second electrical connectors 22 and 24 can support higher data transfer rates within acceptable levels of cross talk compared to right-angle electrical connectors of conventional orthogonal electrical connector systems.

Referring now to FIGS. 2A-2F, the first electrical connector 22 includes a dielectric or electrically insulative first connector housing 30 and a plurality of first electrical contacts 32 that are supported by the first connector housing 30. The first connector housing 30 defines a front end that, in turn, defines a first mating interface 34. The first connector housing 30 further defines a rear end that, in turn, defines a first mounting interface 36 opposite the first mating interface 34 along the longitudinal direction L. Further, the first mating interface 34 can be aligned with the first mounting interface 36 along the longitudinal direction L. The first electrical contacts 32 can define respective first mating ends 32*a* at the first mating interface 34, and first mounting ends 32*b* at the first mounting interface 36. Thus, the first electrical contacts 32 can be configured as vertical contacts whose first mating ends 32*a* and first mounting ends 32*b* are opposite each other with respect to the longitudinal direction L. As will be appreciated from the description below, the first electrical connector 22, and thus the electrical connector system 20, can include a plurality of electrical cables that are mounted to the first electrical contacts 32 at the first mounting interface 36.

The longitudinal direction L defines the mating direction along which the first electrical connector 22 mates with the second electrical connector 24. The first connector housing 30 further defines first and second sides 38 that are opposite each other along a lateral direction A that is oriented substantially perpendicular to the longitudinal direction L. The first connector housing 30 further defines a bottom surface 40 and a top surface 42 opposite the bottom surface 40 along a transverse direction T that is oriented substantially perpendicular to each of the longitudinal direction L and the lateral direction A. The first electrical connector 22 is described herein with respect to the longitudinal direction L, the lateral direction A, and the transverse direction T in the orientation as if mated with the second electrical connector 24 or aligned to be mated with the second electrical connector 24.

Each of the first electrical connectors 22 can be configured to attach to a respective one of the first substrates 26. In one example, the first electrical connectors 22 can be configured to attach to the first substrates 26 adjacent an edge of the first substrate 26 that faces the second substrates 28. The first electrical connectors 22 can be configured to attach to the respective one of the first substrates 26 such that the bottom surface 40 faces the respective one of the first substrates 26. For instance, the first bottom surface 40 can define a first attachment surface that is configured to attach the first electrical connectors 22 to the respective ones of the first substrates 26. For instance, the first connector housing 30 can include an attachment member 31 (see FIGS. 2A-2B) that is configured to attach the first electrical connector 22 to the respective one of the first substrates 26. The attachment m31 ember can extend out from the bottom surface 40. The attachment member 31 can be configured as a projection or an aperture that receives or is received by hardware so as to attach the first electrical connector 24 to a respective one of the first substrates 26. Alternatively or additionally, the attachment member 31 can include a bracket that, in turn, is secured to the respective one of the first substrates 26. Alternatively still, the attachment member 31 can be configured as the first outer housing 37 described above.

Alternatively or additionally, one or more of the first electrical connectors 22, up to all of the first electrical connectors 22, can float. That is, the first electrical connectors 22 can be free from attachment to any of the first and second substrates 26 and 28. An auxiliary attachment structure, if desired, can attach to the first and second substrates 26 and 28 so as to maintain the first and second substrates 26 and 28 in an orthogonal relationship to each other.

It should be appreciated that the attachment surface is different than the ends of the first connector housing 30 that define the first mating interface 34 and the first mounting interface 36. For instance, the attachment surface can extend between the first mating interface 34 and the first mounting interface 36. In one example, the first attachment surface can extend from the first mating interface 34 to the first mounting interface 36. The first mating interface 34 and the first mounting interface 36 can be oriented along respective planes that are substantially parallel to each other. In one example, the first mating interface 34 and the first mounting interface 36 are defined by respective planes that extend along the lateral direction A and the transverse direction T. The first attachment surface can be oriented along a respective plane that is orthogonal to the planes of the first mating interface and the first mounting interface. For instance, the first attachment surface can be oriented along a respective plane that extends along the longitudinal direction L and the lateral direction A. Thus, when the first electrical connector 22 is attached to the first substrate 26, the first substrate 26 is oriented along a plane that extends along the longitudinal direction L and the lateral direction A. It is thus appreciated that the first electrical connector 24 can be attached to the substrate 26 at a different location of the first connector housing 30 than the location of the first connector housing 30 that defines the first mounting interface 36. Further, as will be appreciated from the description below, the electrical cables can be placed in electrical communication with a respective electrical component mounted onto the respective one of the first substrates 26 to which the first electrical connector 22 is attached.

The first mounting ends 32*b* of the first electrical contacts 32 can be configured to electrically connect to any suitable electrical component. For instance, the first mounting ends 32*b* can be configured to electrically connect to respective first electrical cables 44. The first electrical cables 44 can be bundled as desired. The electrical cables 44 are further configured to be placed in electrical communication with the first substrate 26. Thus, the orthogonal electrical connector system can further include the electrical cables 44 that extend from the first electrical connector 22 to a complimentary component on the first substrate 26. For instance, the cables 44 can terminate at a respective first termination connector 46. Thus, the electrical cables 44 can define respective firsts end that are mechanically and electrically attached to respective ones of the electrical contacts of the first electrical connector 22, and respective second ends opposite the first ends that are mechanically and electrically attached to respective ones of electrical contacts of the first termination connector 46. The first termination connector 46 can be configured to mate with a first complementary electrical connector 49 that is mounted to the first substrate 26. Alternatively, the complementary electrical connector 49 can be mounted to an electrical component that is mounted onto the first substrate 26. For instance, the electrical component can be configured as an integrated circuit (IC) package 27 as described in more detail below. Thus, the second ends of the electrical cables 44 can be configured to be placed in electrical communication with the substrate 26, and in particular with one or more electrical components mounted onto the first substrate 26.

It should be appreciated that the first termination connectors 46 can be provided in an array of first termination electrical connectors 46 that includes an outer first termination housing, and the first termination connectors 46 supported in the outer first termination housing in the manner described above. Thus, the electrical connector assembly 20 can include a plurality of arrays of first termination connectors 46. Alternatively, the first termination connectors 46 can be provided individually and mated individually to respective ones of the first complementary electrical connectors 49.

In this regard, it should be appreciated that the first complementary electrical connectors 49 can be provided in an array of first complementary electrical connectors 49 that includes an outer first complementary housing, and the first complementary connectors 49 supported in the outer first complementary housing in the manner described above. Thus, the electrical connector assembly 20 can include a plurality of arrays of first complementary connectors 49. Alternatively, the first complementary connectors 49 can be provided individually and mated individually to respective ones of the first termination electrical connectors 46.

The first electrical connector 22, the respective electrical cables, and the corresponding first termination connector 46 can define an electrical cable assembly. The electrical cable assembly is configured to place the electrical component mounted on the first substrate 26 in electrical communication with the respective one of the second substrates 28 when the first and second electrical connectors 22 and 24 are mated with each other. In particular, the first termination connector 46 and the complimentary connector 49 can be mated with each other so as to place the electrical cables 44 in electrical communication with one or both of the first substrate 26 and the IC package 27. Alternatively, the cables 44 can be mounted directly to one of the first substrate 26 and the IC package 27. The first termination electrical connector 46 and the complementary electrical connector 49 are described in more detail below. In one example, the cables 44 can be configured as twin axial cables. Thus, the cables 44 can include a pair of signal conductors that is disposed within an outer insulative jacket, and at least one drain wire or alternatively configured ground. In one example, the cables 44 are devoid of drain wires, and instead includes an electrically conductive ground member that is attached at one end to the ground shields of the cables 44, and attached at another end to the ground mounting ends. It should be appreciated, however, that the cables 44 can be alternatively constructed as desired.

The first electrical contacts 32 can be arranged in respective first linear arrays 47. The linear arrays 47 can be oriented parallel to each other. The first electrical connector 22 can include any number of linear arrays as desired. For instance, the first electrical connector 22 can include two or more linear arrays 47. For instance, the first electrical connector 22 can include three or more linear arrays 47. For instance, the first electrical connector 22 can include four or more linear arrays 47. For instance, the first electrical connector 22 can include five or more linear arrays 47. For instance, the first electrical connector 22 can include six or more linear arrays 47. For instance, the first electrical connector 22 can include seven or more linear arrays 47. For instance, the first electrical connector 22 can include eight or more linear arrays 47. In this regard, it should be appreciated that the first electrical connector 22 can include any number of linear arrays as desired. As will be further appreciated from the description below, the first electrical connector 22 can include ground shields disposed between respective adjacent ones of the linear arrays 47.

The first linear arrays 47 can be oriented substantially along the transverse direction T. Thus, reference to the first linear array 47 and the transverse direction T herein can be used interchangeably unless otherwise indicated. The first linear arrays 47 can be oriented substantially along a direction that intersects the plane defined by the attachment surface of the first connector housing. Similarly, the first linear arrays 47 can be oriented substantially along a direction that intersects the first substrate 26 to which the first electrical connector 22 is attached. The term "substantially" recognizes that the electrical contacts 32 of each of the first linear arrays can define regions that are offset from each other. For instance, one or more of the mating ends 32*a* can be offset from each other along the lateral direction A as described in more detail below. Further, the first linear arrays 47 can be oriented in a direction that is substantially perpendicular to the plane of the first substrate 26 to which the first electrical connector 22 is attached.

The first linear arrays 47 can be spaced from each other along a direction that is substantially parallel to the plane defined by the first substrate 26 to which the first electrical connector 22 is attached. Thus, the first linear arrays 47 can be spaced from each other along the lateral direction A. Because the first electrical contacts 32 are vertical contacts and lie in the respective first linear arrays 47, respective entireties of the electrical contacts 32 lie in a respective one of the first linear arrays 47 that extends along the respective direction. The respective direction can be a substantially linear direction. Thus, the mating ends 32*a* of each first linear array 47 are spaced from the mating ends 32*a* of adjacent ones of the first linear arrays 47 along the lateral direction A. Further, the mounting ends 32*b* of each first linear array 47 is spaced from the mounting ends 32*b* of adjacent ones of the first linear arrays 47 along the lateral direction A.

The first electrical contacts 32 can include a plurality of first signal contacts 48 and a plurality of first electrical grounds 50 disposed between respective ones of the first signal contacts 48. For instance, the adjacent ones of the first signal contacts 48 that are adjacent each other along the first linear array 47 can define a differential signal pair. While the first signal contacts 48 and the first grounds 50 can be said to extend along a first linear array, it is recognized that at least a portion up to an entirety of the first signal contacts and the first grounds 50 can be offset with respect to each other along the lateral direction A. As described in more detail below, the first signal contacts 48 and the first grounds 50 can be said to extend along a first linear array, since they are defined by the same leadframe assembly 62 that is oriented along the first linear array. It should be appreciated, however, that each of the first signal contacts 48 and each of the first grounds 50 can also be said to extend along respective linear arrays that are offset with respect to each other along the lateral direction A.

It should be appreciated that the first signal contacts 48 are not defined by electrical contact pads of a printed circuit board or electrical contacts of a printed circuit board. Further, the first grounds are not defined by electrical contact pads of a printed circuit board or electrical contacts of a printed circuit board. Thus, it can be said that the first electrical contacts 32 can, in certain examples, not be defined by electrical contact pads of a printed circuit board or electrical contacts of a printed circuit board. Further, in the illustrated example, the first electrical connector 22 does not include any printed circuit boards.

In one example, the first signal contacts 48 of each differential pair can be edge coupled. That is, the edges of the contacts 48 that define differential pairs face each other. Alternatively, the first electrical contacts 48 can be broadside coupled. That is, the broadsides of the first electrical contacts 48 of the differential pairs can face each other. The edges are shorter than the broadsides in a plane defined by the lateral direction A and the transverse direction T. The edges can face each other within each first linear array. The broadsides of the first electrical contacts 48 of adjacent first linear arrays can face each other. Each adjacent differential signal pair along a respective one of the first linear arrays 47 can be separated by at least one ground in a repeating pattern. Each of the first signal contacts 48 can define a respective first mating end 48*a*, a respective first mounting end 48*b*, and an intermediate region that extends between the first mating end 48*a* and the first mounting end 48*b*. For instance, the intermediate region can extend from the first mating end 48*a* to the first mounting end 48*b*.

The first mounting ends 48*b* can be placed in electrical communication with respective signal conductors of the electrical cables 44. Further, each of the first grounds 50 can include at least one first ground mating end 54*a* and at least one first ground mounting end 54*b*. The first ground mounting ends 54*b* can be placed in electrical communication with respective grounds or drain wires of the electrical cables 44. The first mating ends 32*a* of the first electrical contacts 32 can include the first mating ends 48*a* of the first signal contacts 48 and the first ground mating ends 54*a*. The first mounting ends 32*b* of the first electrical contacts 32 can include the first mounting ends 48*b* of the first signal contacts 48 and the first ground mounting ends 54*b*.

It should thus be appreciated that the electrical cables 44 can be electrically connected to the first mounting ends 32*b*. In particular, when the electrical cables 44 are configured as twin axial cables, each of the cables can be electrically connected to the mounting ends of adjacent electrical signal contacts that define a differential pair. The electrical cables 44 can each further be electrically connected to ground plates 66 disposed adjacent to the differential signal pair, as described in more detail below. For instance, the electrical cables 44 can each further be electrically connected to the ground mounting ends of the ground plates 66. The ground plates can be disposed immediately adjacent to the respective differential signal pair. That is, no electrical contacts are disposed between the ground mounting ends and the mounting ends of the differential signal pair of signal contacts along the respective linear array.

The mating ends 48*a* of adjacent differential signal pairs along the first linear array can be separated by at least one ground mating end 54*a* along the transverse direction T. In one example, the mating ends 48*a* of adjacent differential signal pairs can be separated by a plurality of ground mating ends 54*a*. For instance, the mating ends 48*a* of the signal contacts 48 can define a convex contact surface 56, and a concavity opposite the convex contact surface 56 with respect to the lateral direction A. The ground mating ends 54*a* can include at least one first type of ground mating end

54*a* having a convex contact surface 58 that faces a first same direction as the convex contact surfaces 56, and an opposed concavity that faces a second same direction as the concavities of the signal contacts 48. The first same direction can be oriented opposite the second same direction. The first and second same directions can be oriented along the lateral direction A.

In one example, the ground mating ends 54*a* can include a pair of first types of ground mating ends 54*a* disposed between adjacent differential signal pairs along the respective first linear array 47, and thus along the transverse direction T. The first types of ground mating ends 54*a* can be aligned with each other along the transverse direction T. The ground mating ends 54*a* can further include a second type of ground mating end 54*a* having a convex contact surface 60 that faces opposite the convex contact surfaces 56 and 58. The second types of ground mating ends 54*a* can be aligned with each other along the transverse direction T. The convex contact surface 60 can face the second same direction. The second type of ground mating end 54*a* can be disposed adjacent the at least one first type of ground mating end 54*a* along the respective first linear array 47, and thus between the mating ends of adjacent differential signal pairs of the respective first linear array 47. In one example, the second type of ground mating end 54*a* can be disposed between adjacent first and second ones of the first types of ground mating ends 54*a* that define the pair of the first type of ground mating ends 54*a* along the first linear array, and thus with respect to the transverse direction T. For instance, the second type of ground mating ends 54*a* can be equidistantly spaced between the first and second ones of the first types of ground mating ends 54*a*. Accordingly, three ground mating ends 54*a* (e.g., two of the first types of ground mating ends and one of the second types of ground mating ends can be disposed between the mating ends of first and second pairs of immediately adjacent differential signal pairs in a repeating pattern. The term "immediately adjacent" in this context means that no additional differential signal pairs are disposed between the two pairs of immediately adjacent differential signal pairs. The first types of ground mating ends 54*a* can be offset with respect to the mating ends 48*a* of the first electrical signal contacts 48 along the lateral direction A. The second types of ground mating ends 54*a* can be offset with respect to the first types of ground mating ends 54*a* along the lateral direction A, such that the first types of ground mating ends 54*a* are disposed between the mating ends 48*a* and the second types of ground mating ends 54*a* along the lateral direction A. The second type of ground mating ends 54*a* can define a respective concavity opposite the respective convex contact surface 60, and thus faces the first same direction. As will be appreciated from the description below, the first grounds are configured to receive a ground plate of the second electrical connector between the first types of ground mating ends 54*a* and the second types of ground mating ends 54*a*.

It should thus be appreciated that the mating ends 48*a* of the signal contacts of each first linear array 47 can be offset along the lateral direction A with respect to one or more of the ground mating ends 54*a* of the first linear arrays 47. Alternatively, the mating ends 48*a* of the signal contacts of each first linear array 47 can be aligned with one or more of the ground mating ends 54*a* of the first linear arrays 47 along the transverse direction T. The ground mating ends 54*a* and the mating ends 48*a* of the signal contacts 48 can be spaced from each other at the same pitch along the transverse direction T. Alternatively, the ground mating ends 54*a* and the mating ends 48*a* of the signal contacts 48 can be spaced from each other at different pitches along the transverse direction T.

The mounting ends 48*b* of adjacent differential signal pairs can be separated by at least one ground mounting end 54*b* along the transverse direction T. In one example, the mounting ends 48*b* of adjacent differential signal pairs can be separated by a plurality of ground mounting ends 54*b*. For instance, the mounting ends 48*b* of the signal contacts 48 can be separated by a pair of ground mounting ends 54*b*. The ground mounting ends 54*b* and the mounting ends 48*b* of the signal contacts 48 of each first linear array can further be aligned with each other along the transverse direction T. Alternatively, the ground mounting ends 54*b* and the mounting ends 48*b* of the signal contacts 48 of each first linear array can be offset from each other along the lateral direction A. The first mounting ends 48*b* and the first ground mounting ends 54*b* can be configured in any manner as desired, including but not limited to solder balls, press-fit tails, j-shaped leads. Alternatively, and as described above, the first mounting ends 48*b* and the first ground mounting ends 54*b* can be configured as cable mounts that attach to respective electrical conductors and electrical grounds of an electrical cable.

As described above, the vertical contacts 32 of the first electrical connector define an overall length from their mating ends 32*a* to their mounting ends 32*b*. The overall length can be shorter with respect to electrical contacts of right-angle connectors of conventional orthogonal electrical connector systems. Further, the vertical contacts 32 do not suffer from skew that is produced from right-angle electrical contacts having different lengths that define differential signal pairs when the first and second electrical connectors 22 and 24 are mated to each other. Thus, as described below, the electrical contacts 32 can operate more reliably at faster data transfer rates in orthogonal applications compared to orthogonal right-angle electrical connectors.

In one example, the overall length of the first electrical contacts 32 can be in a range between and including substantially 1 mm and substantially 16 mm. For instance, the overall length of the first electrical contacts 32 can be in a range between and including substantially 2 mm and substantially 10 mm. For example, the overall length of the first electrical contacts 32 can be in a range between and including substantially 3 mm and substantially 5 mm. In particular, the overall length of the first electrical contacts 32 can be substantially 4.3 mm.

The first linear arrays 47 can include first, second, and third ones of the first linear arrays 47 that are adjacent to each other. The first linear arrays can be arranged such that the second first linear array is between the first and third first linear arrays and immediately adjacent the first and third first linear arrays. Each of the first, second, and third ones of the first linear arrays 47 can include respective arrangements of differential signal pairs separated from each other by at least one ground. One of the differential signal pairs of the second one of the first linear arrays can be defined as a victim differential signal pair, and differential signals with data transfer rates of substantially 40 Gigabits/sec in six differential signal pairs in the first, second, and third ones of the first linear arrays 47 that are closest to the victim differential signal pair produce no more than six percent of worst-case, multi-active cross talk on the victim differential signal pair at a rise time between 20-40, in one example. For instance, the worst-case, multi-active cross talk on the victim differential signal pair can be no more than five percent in one example. For instance, the worst-case, multi-active cross talk on the victim differential signal pair can be no more than four percent. For instance, the worst-case, multi-active cross talk on the victim differential signal pair can be no more than three percent. For instance, the worst-case, multi-active cross talk on the victim differential signal pair can be no more than two percent. For instance, the worst-case, multi-active cross talk on the victim differential signal pair can be no more than one percent. The data transfer rates can be between and including substantially 56 Gigabits/second and substantially 112 Gigabits/second.

It is recognized that the grounds 50 can be defined by respective discrete ground contacts. Alternatively, the grounds 50 can be defined by a respective one of a plurality of ground plates 66. With continuing reference to FIGS. 2A-2F, in one example the first electrical connector 22 can include a plurality of first leadframe assemblies 62 that are supported by the first connector housing 30. Each of the first leadframe assemblies 62 can include a dielectric or electrically insulative first leadframe housing 64, and a respective first linear array 47 of the plurality of first electrical contacts 32. Thus, it can be said that each leadframe assembly 62 is oriented along one of the first linear arrays 47 of the first electrical connector 22. The leadframe housing 64 can be overmolded onto the respective signal contacts 48. Alternatively, the signal contacts 48 can be stitched into the leadframe housing 64. Further, the grounds of the respective first linear array 47 can be defined by a first ground plate 66 as described above. The ground plate 66 can include a plate body 68 that is supported by the leadframe housing 64, such that the ground mating ends 54*a* and the ground mounting ends 54*b* extend out from the plate body 68. Thus, the plate body 68, the ground mating ends 54*a*, and the ground mounting ends 54*b* can all be monolithic with each other. Respective ones of the ground plate bodies 68 can be disposed between respective adjacent linear arrays of the intermediate regions of the electrical signal contacts 48.

Each of the leadframe assemblies 62 can define at least one aperture 71 that extends through each of the leadframe housing 64 and the ground plate 66 along the lateral direction. The at least one aperture 71 can include a plurality of apertures 71. A perimeter of the at least one aperture 71 can be defined by a first portion 65*a* of the leadframe housing 64. The first portion 65*a* of the leadframe housing 64 can be aligned with the ground plate 66 along the lateral direction A. The leadframe housing 64 can further include a second portion 65*b* that cooperates with the first portion 65*a* so as to capture the ground plate 66 therebetween along the lateral direction A. The quantity of electrically insulative material of the leadframe housing 64 can further control the impedance of the first electrical connector 22. Further, a region of each at least one aperture 71 can be aligned with the signal mating ends 48*a* of the electrical signal contacts along the longitudinal direction L.

The ground plate 66 can be configured to electrically shield the signal contacts 48 of the respective first linear array 47 from the signal contacts 48 of an adjacent one of the first linear arrays 47 along the lateral direction A. Thus, the ground plates 66 can also be referred to as electrical shields. Further, it can be said that an electrical shield is disposed between, along the lateral direction A, adjacent ones of respective linear arrays of the electrical signal contacts 48. In one example, the ground plates 66 can be made of any suitable metal. In another example, the ground plates 66 can include an electrically conductive lossy material. In still another example, the ground plates 66 can include an electrically nonconductive lossy material.

Figure 3A:
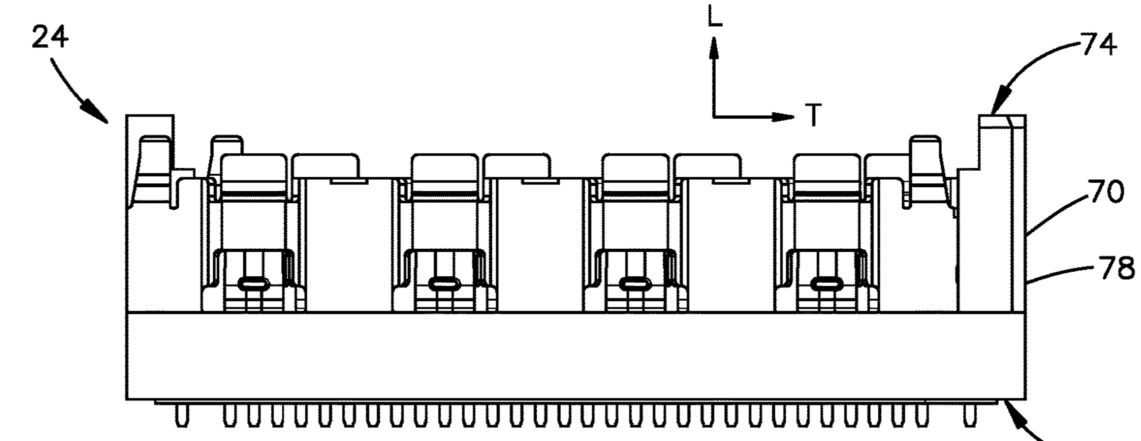
FIG. 3A is a sectional side elevation view of a portion of a second electrical connector of the orthogonal electrical connector system illustrated in FIG. 1A.

Referring now to FIGS. 3A-GF, the second electrical connector 24 includes a dielectric or electrically insulative second connector housing 70 and a plurality of second electrical contacts 72 that are supported by the second connector housing 70. The second connector housing 70 defines a front end that, in turn, defines a second mating interface 74. The second connector housing 70 further defines a rear end that, in turn, defines a second mounting interface 76 opposite the second mating interface 74 along the longitudinal direction L. Further, the second mating interface 74 can be aligned with the second mounting interface 76 along the longitudinal direction L. The second electrical contacts 72 can define respective second mating ends 72*a* at the second mating interface 74, and second mounting ends 72*b* at the second mounting interface 76. Thus, the second electrical contacts 72 can be configured as vertical contacts whose second mating ends 72*a* and second mounting ends 72*b* are opposite each other with respect to the longitudinal direction L.

The longitudinal direction L defines the mating direction along which the second electrical connector 24 mates with the first electrical connector 22. The second connector housing 70 further defines first and second sides 78 that are opposite each other along the transverse direction T. The second connector housing 70 further defines a bottom surface 80 and a top surface 82 opposite the bottom surface 80 along the lateral direction A. The second electrical connector 24 is described herein with respect to the longitudinal direction L, the lateral direction A, and the transverse direction T in the orientation as if mated with the second electrical connector 24 or aligned to be mated with the first electrical connector 22. The second electrical connector 24 can define a receptacle connector, and the first electrical connector 22 can define a plug that is received in the receptacle of the second electrical connector 24. Alternatively, the first electrical connector 22 can define a receptacle connector, and the second electrical connector 24 can define a plug that is received in the receptacle of the first electrical connector 22.

Figure 3B:
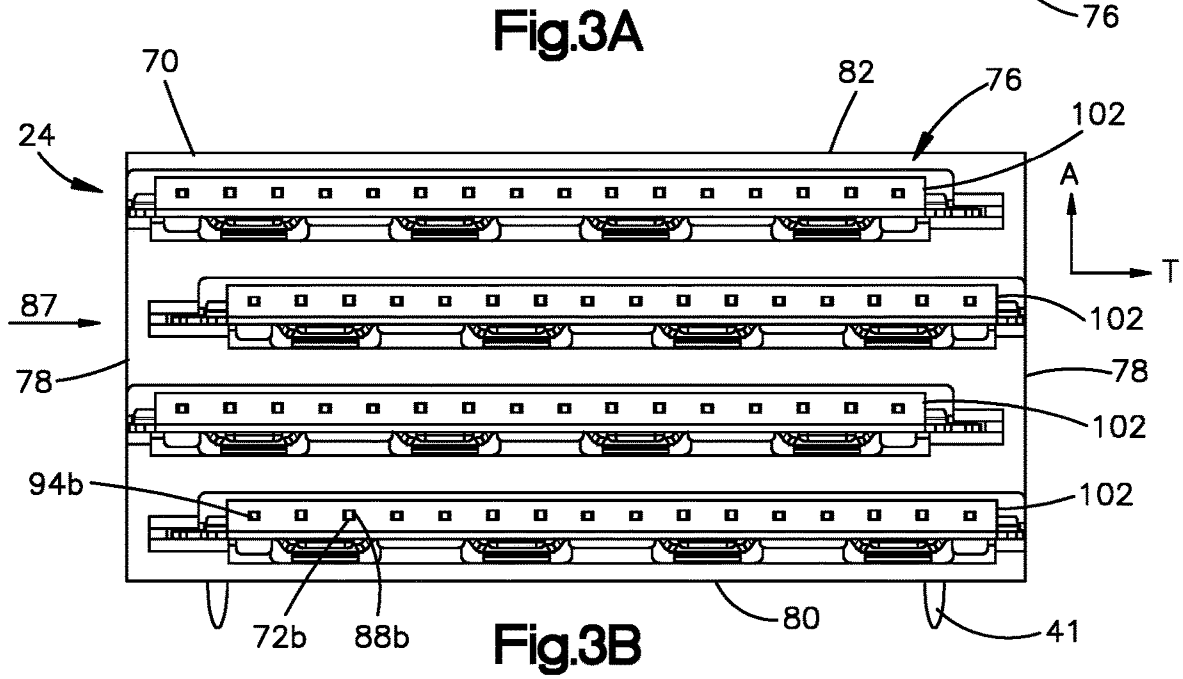
FIG. 3B is a rear elevation view of the second electrical connector illustrated in FIG. 3A.
Figure 3C:
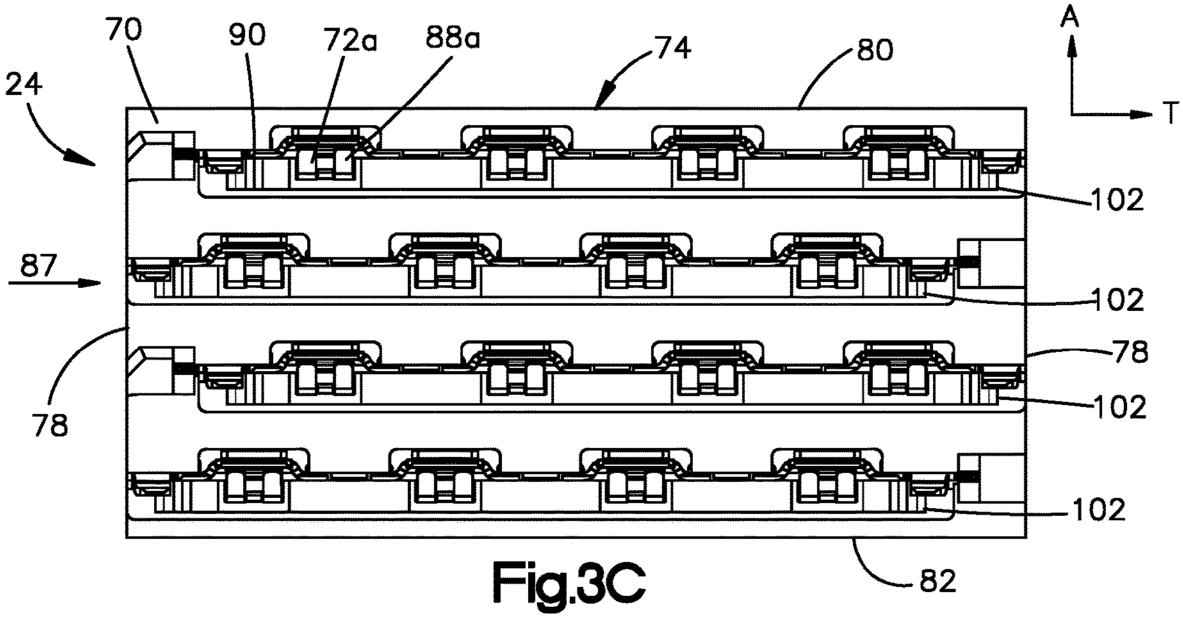
FIG. 3C is a front elevation view of a portion of the electrical connector illustrated in FIG. 3A.
Figure 3D:
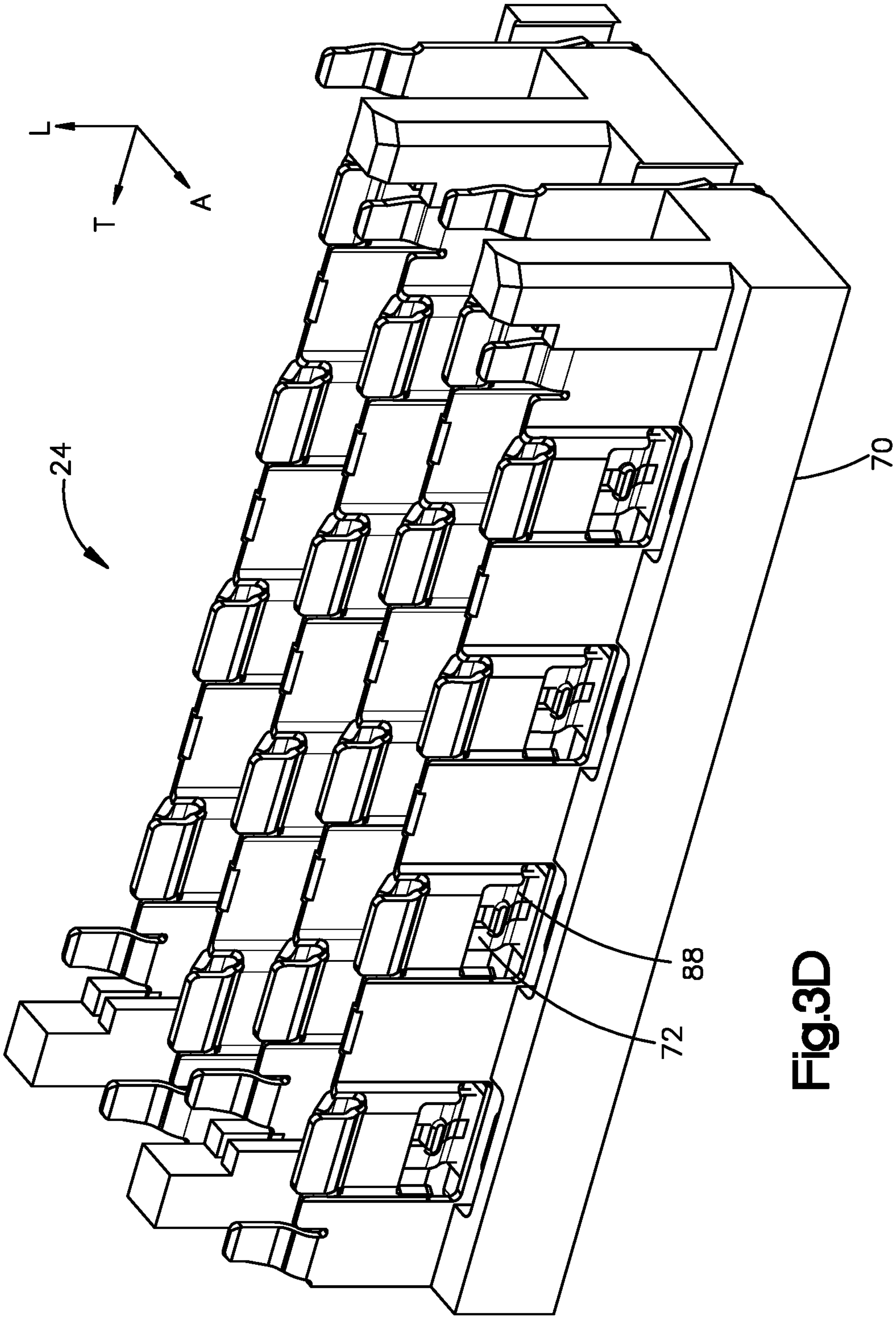
FIG. 3D is a front perspective view of the second electrical connector illustrated in FIG. 3A.
Figure 3E:
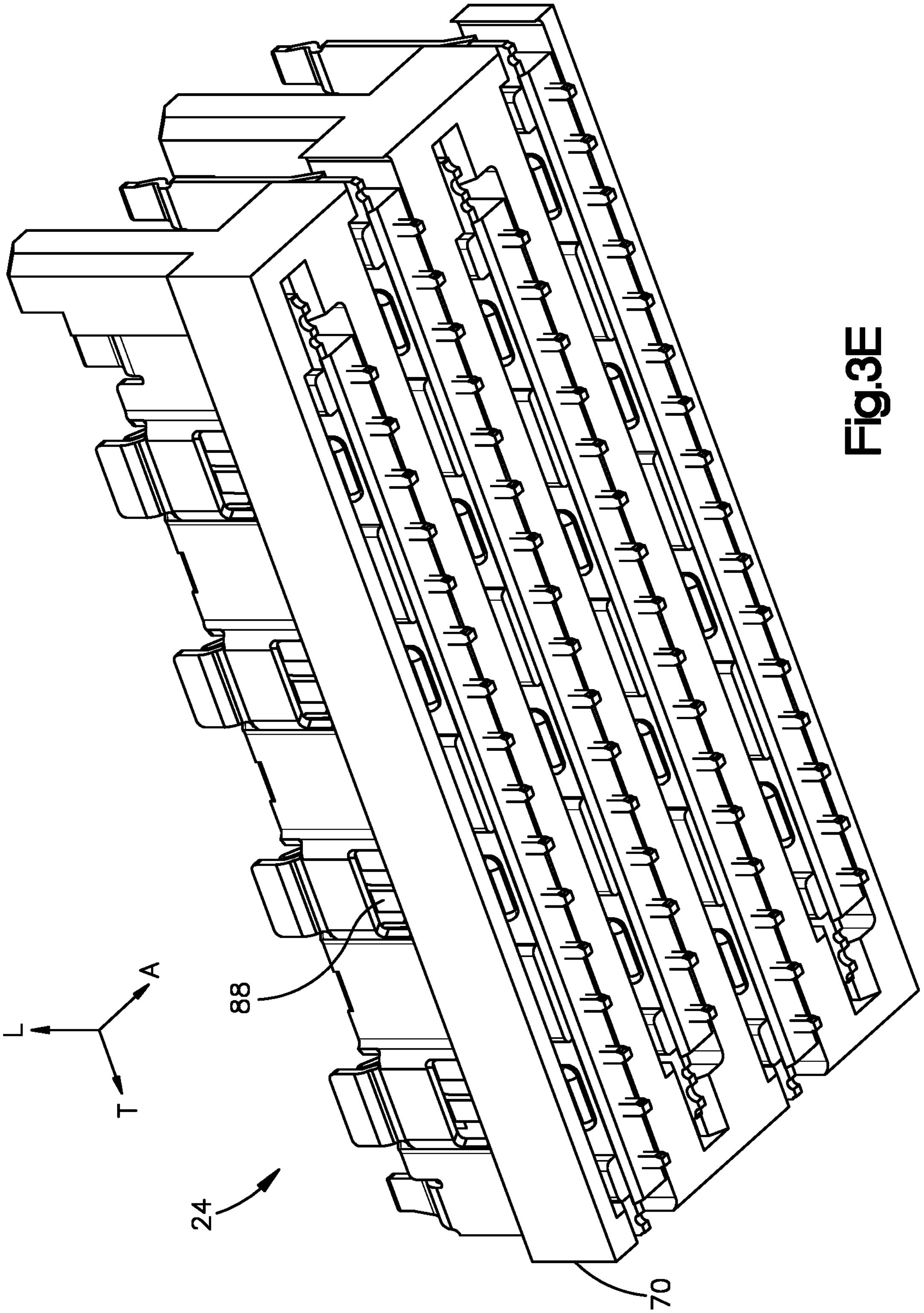
FIG. 3E is a rear perspective view of the second electrical connector illustrated in FIG. 3A.
Figure 3F:
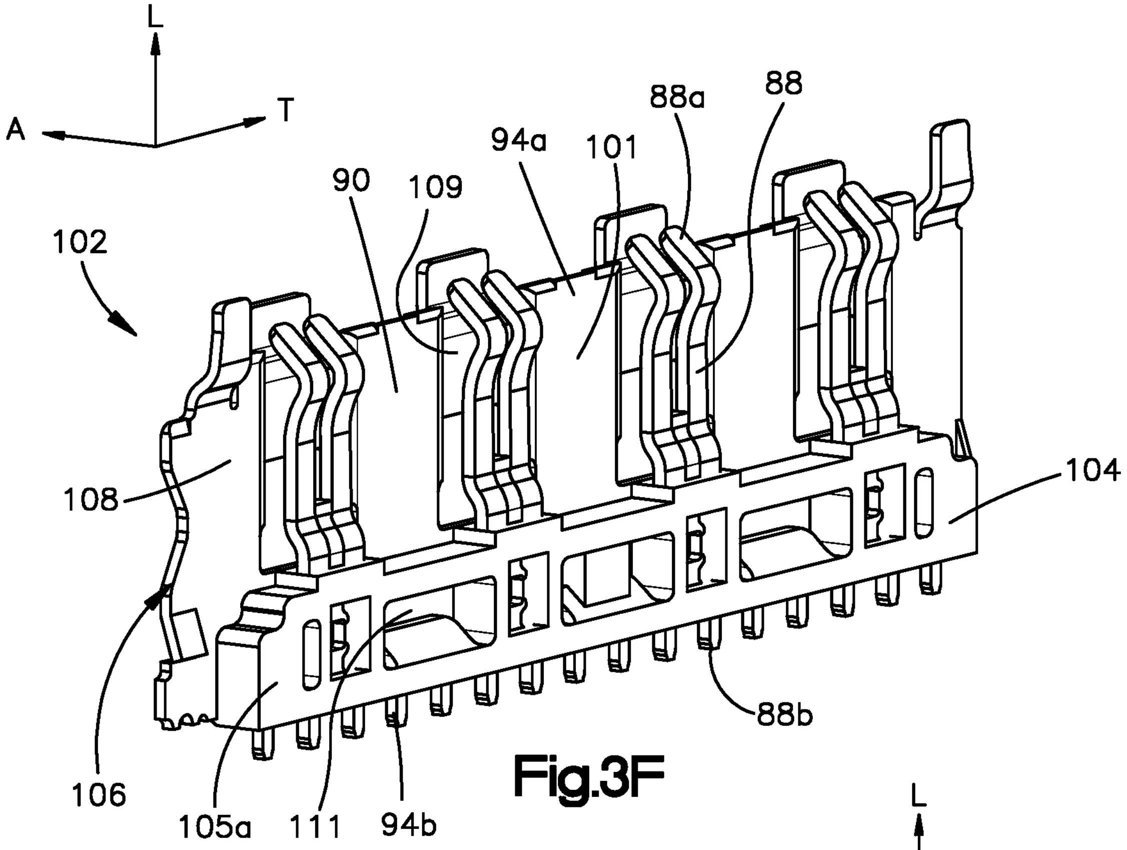
FIG. 3F is a perspective view of a leadframe assembly of the second electrical connector illustrated in FIG. 3A.
Figure 3G:
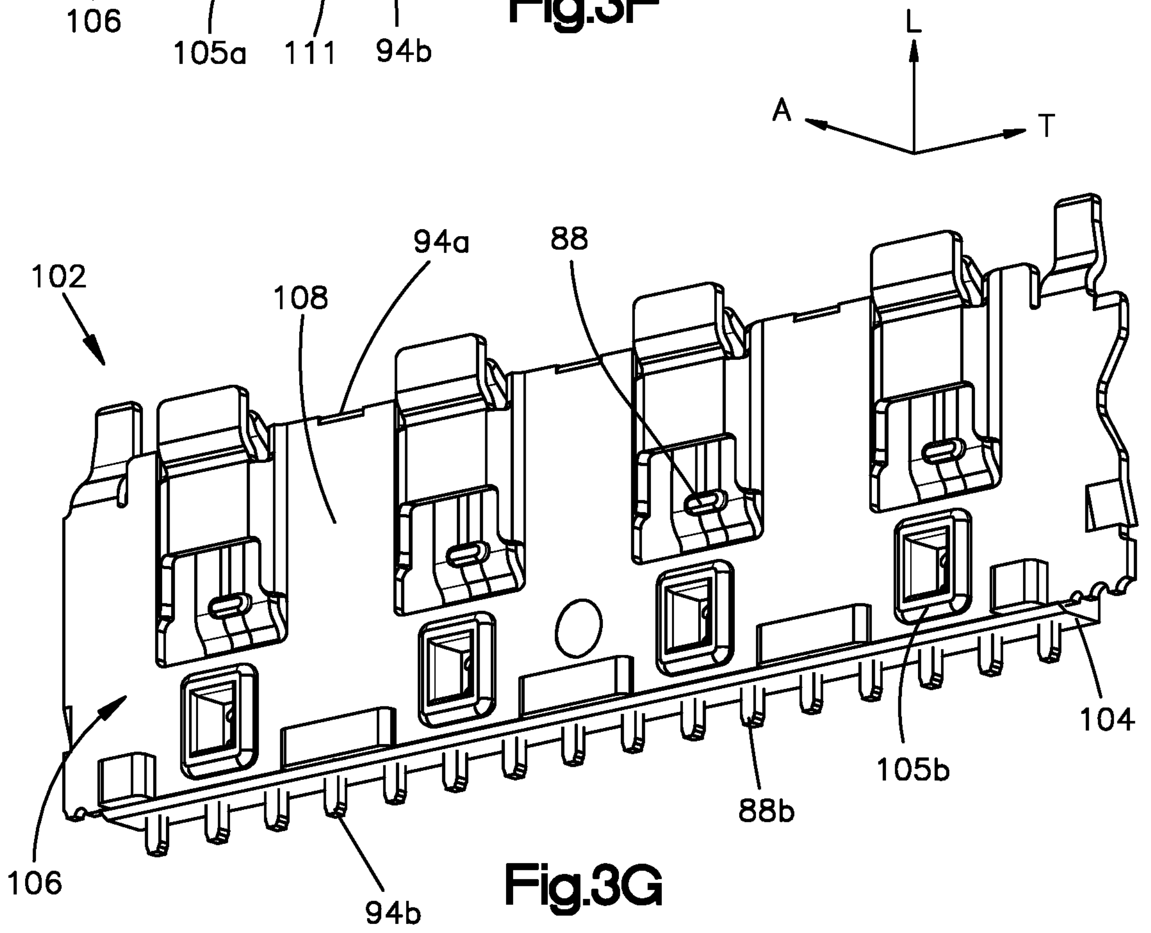
FIG. 3G is another perspective view of the leadframe assembly of the second electrical connector illustrated in FIG. 3A.

Each of the second electrical connectors 24 can be configured to attach to a respective one of the second substrates 28. In one example, the second electrical connectors 24 can be configured to attach to the second substrates 28 adjacent an edge of the second substrate 28 that faces the first substrates 26. The second electrical connectors 24 can be configured to attach to the respective one of the second substrates 28 such that the bottom surface 80 faces the respective one of the second substrates 28. For instance, the second bottom surface 80 can define a second attachment surface that is configured to attach the second electrical connectors 24 to the respective ones of the second substrates 28. For instance, the second connector housing 70 can include an attachment member 41 (see FIG. 3B) that is configured to attach to the respective one of the second substrates 28. The attachment member can extend out from the bottom surface 80. It is recognized that the bottom surface 80 of the second electrical connector 24 faces a direction perpendicular to the direction that the bottom surface 40 of the first electrical connector 22 faces. The attachment member of the second electrical connector 24 can be configured as a projection or an aperture that receives hardware that attaches the second electrical connector 24 to the respective one of the second substrates 28. Alternatively or additionally, the attachment member can include a bracket that, in turn, is secured to the respective one of the second substrates 28. Alternatively still, the attachment member 31 can be configured as the second outer housing 39 described above.

Alternatively or additionally, one or more of the second electrical connectors 24, up to all of the second electrical connectors 24, can float. That is, the second electrical connectors 24 can be free from attachment to each of the first and second substrates 26 and 28. An auxiliary attachment structure, if desired, can attach to the first and second substrates 26 and 28 so as to maintain the first and second substrates 26 and 28 in an orthogonal relationship to each other.

It should be appreciated that the attachment surface of the second electrical connector 24 is different than the ends of the second connector housing 70 that define the second mating interface 74 and the second mounting interface 76. For instance, the second attachment surface of the second electrical connector 24 can extend between the second mating interface 74 and the second mounting interface 76. In one example, the second attachment surface can extend from the second mating interface 74 to the second mounting interface 76. The second mating interface 74 and the second mounting interface 76 can be oriented along respective planes that are substantially parallel to each other. In one example, the second mating interface 74 and the second mounting interface 76 are defined by respective planes that extend along the lateral direction A and the transverse direction T. The second attachment surface can be oriented along a respective plane that is orthogonal to the planes of the second mating interface and the second mounting interface. For instance, the second attachment surface can be oriented along a respective plane that extends along the longitudinal direction L and the transverse direction T. Thus, when the second electrical connector 24 is attached to the second substrate 28, the second substrate 28 is oriented along a plane that extends along the longitudinal direction L and the lateral direction T. Thus, the second substrates 28 are oriented orthogonal with respect to the first substrates 26.

The second mounting ends 72*b* of the second electrical contacts 72 can be configured to electrically connect to any suitable electrical component. For instance, the second mounting ends 72*b* can be configured to electrically connect to respective second electrical cables 84. The second electrical cables 84 can be bundled as desired. The electrical cables 84 are further configured to be placed in electrical communication with the second substrate 28. Thus, the orthogonal electrical connector system 20 can further include the second electrical cables 84 that extend from the second electrical connector 24 to a second complimentary electrical connector 83 that can be placed in electrical communication with the second substrate 28. For instance, the second electrical cables 84 can terminate at a respective second termination connector 83 that is configured to mate with a second complementary electrical connector 85 that is mounted to the second substrate 28. The second termination connector and the complimentary connector can be mated with each other so as to place the second electrical cables 84 in electrical communication with the second substrate 28. Alternatively, the second electrical cables 84 can be mounted directly to the second substrate 28. In one example, the cables 84 can be configured as twin axial cables. Thus, the cables 84 can include a pair of signal conductors disposed within an outer insulative jacket. It should be appreciated, however, that the cables 84 can be alternatively constructed as desired.

In one example, it is recognized that the cable assembly can be devoid of the first and second electrical connectors 22 and 24. Rather, the cable assembly can include the electrical connectors 83 and 46, and a plurality of electrical cables of the type described herein that are mounted at a first end to respective electrical contacts of the electrical connector 46, and at a second end to respective electrical contacts of the electrical connector 83. The electrical cables can be selectively attached to and detached from the first substrate 26, for instance by mating the electrical connector 46 to, and unmating the electrical connector 46 from, the electrical connector 49. The electrical cables can be selectively attached to and detached from the second substrate 28, for instance by mating the electrical connector 83 to, and unmating the electrical connector 83 from, the electrical connector 85.

The second electrical contacts 72 can be arranged in respective second linear arrays 87. The linear arrays 87 can be oriented parallel to each other. The second electrical connector 24 can include any number of linear arrays 87 as desired. For instance, the second electrical connector 24 can include two or more linear arrays 87. For instance, the second electrical connector 24 can include three or more linear arrays 87. For instance, the second electrical connector 24 can include four or more linear arrays 87. For instance, the second electrical connector 24 can include five or more linear arrays 87. For instance, the second electrical connector 24 can include six or more linear arrays 87. For instance, the second electrical connector 24 can include seven or more linear arrays 87. For instance, the second electrical connector 24 can include eight or more linear arrays 87. In this regard, it should be appreciated that the second electrical connector 24 can include any number of linear arrays as desired. As will be further appreciated from the description below, the second electrical connector 24 can include ground shields disposed between respective adjacent ones of the linear arrays 87.

The second linear arrays can be oriented substantially along the transverse direction T. Thus, reference to the second linear array 87 and the transverse direction T herein can be used interchangeably unless otherwise indicated. The second linear arrays 87 can be oriented substantially along a direction that is substantially parallel to the plane defined by the second attachment surface of the second connector housing 70. Similarly, the second linear arrays 87 can be oriented substantially along a direction that is substantially parallel to the second substrate 28 to which the second electrical connector 24 is attached. The term "substantially" recognizes that the second electrical contacts 72 of each of the second linear arrays 87 can define regions that are offset from each other. For instance, the direction of the second linear arrays 87 can be oriented substantially perpendicular to the plane of the second substrate 28 to which the second electrical connector 24 is attached. Further, one or more of the mating ends 72*a* can be offset from each other along the lateral direction A as described in more detail below.

The second linear arrays 87 can be spaced from each other along a direction that intersects the second attachment surface. Thus, the second linear arrays 87 can be spaced from each other along a direction that intersects the plane defined by the second substrate 28 to which the second electrical connector 24 is attached. For instance, the second linear arrays 87 can be spaced from each other along a direction that is substantially perpendicular to the second attachment surface. In one example, the second linear arrays 87 can be spaced from each other along a direction that is perpendicular to the plane defined by the second substrate 28 to which the second electrical connector 24 is attached. Thus, the second linear arrays 87 can be spaced from each other along the lateral direction A. Because the second electrical contacts 72 are vertical contacts and lie in the respective second linear arrays 87, respective entireties of the electrical contacts 72 lie in a respective one of the second linear arrays 87 that extends along the respective direction. The respective direction can be a substantially linear direction. Thus, the mating ends 72*a* of each second linear array 87 are spaced from the mating ends 72*a* of adjacent ones of the second linear arrays 87 along the lateral direction A. Further, the mounting ends 72*b* of each second linear array 87 are spaced from the mounting ends 72*b* of adjacent ones of the second linear arrays 87 along the lateral direction A.

The second electrical contacts 72 can include a plurality of second signal contacts 88 and a plurality of second grounds 90 disposed between respective ones of the second signal contacts 88. At least respective portions of the grounds 90 can be substantially planar, for instance along a plane defined by the longitudinal direction L and the transverse direction T. In this regard, the grounds 90 can be defined by ground plates 106 as described in more detail below. In one example, the adjacent ones of the second signal contacts 88 that are adjacent each other along the second linear array 87 can define a differential signal pair. While the second signal contacts 88 and the second grounds 90 can be said to extend along a second linear array 87, it is recognized that at least a portion up to an entirety of the second signal contacts 88 and the second grounds 90 can be offset with respect to each other along the lateral direction A. As described in more detail below, the second signal contacts 98 and the second grounds 90 can be said to extend along a second linear array, since they are defined by a single leadframe assembly 102 that is oriented along the second linear array. It should be appreciated, however, that each of the second signal contacts 88 and each of the second grounds 90 can also be said to extend along respective linear arrays that are offset with respect to each other along the lateral direction A.

It should be appreciated that the second signal contacts 88 are not defined by electrical contact pads of a printed circuit board or electrical contacts of a printed circuit board. Further, the second grounds 90 are not defined as electrical contact pads of a printed circuit board or electrical contacts of a printed circuit board. Thus, it can be said that the second electrical contacts 72 can, in certain examples, not be defined by electrical contact pads of a printed circuit board or electrical contacts of a printed circuit board. Further, in the illustrated example, the second electrical connector 24 does not include any printed circuit boards.

In one example, the second signal contacts 88 of each differential pair can be edge coupled. That is, the edges of the contacts 88 that define differential pairs face each other. Alternatively, the second electrical contacts 88 can be broadside coupled. That is, the broadsides of the second electrical contacts 88 of the differential pairs can face each other. The edges are shorter than the broadsides in a plane defined by the lateral direction A and the transverse direction T. The edges can face each other within each of the respective second linear arrays. The broadsides of the second electrical contacts 88 of adjacent second linear arrays 87 can face each other along the lateral direction A, though a ground plate 106 can be disposed between the broadsides of adjacent second linear arrays 87 with respect to the lateral direction A. Each adjacent differential signal pair along a respective one of the second linear arrays 87 can be separated by at least one ground in a repeating pattern. Each of the second signal contacts 88 can define a respective second mating end 88*a*, a respective second mounting end 88*b*, and an intermediate region that extends between the second mating end 88*a* and the second mounting end 88*b*. For instance, the intermediate region can extend from the second mating end 88*a* to the second mounting end 88*b*.

The second mounting ends 88*b* can be placed in electrical communication with respective electrical signal conductors of the electrical cables 84. Further, each of the second grounds 90 can include at least one second ground mating end 94*a* and at least one second ground mounting end 94*b*. The second ground mounting ends 94*b* can be placed in electrical communication with respective grounds or drain wires of the electrical cables 84. In one example, the cables 84 are devoid of drain wires, and instead includes an electrically conductive ground member that is attached at one end to the ground shields of the cables 84, and attached at another end to the ground mounting ends 94*b*. The second mating ends 72*a* of the second electrical contacts 72 can include the second mating ends 88*a* of the second signal contacts 88 and the second ground mating ends 94*a*. The second mounting ends 72*b* of the second electrical contacts 72 can include the second mounting ends 88*b* of the second signal contacts 88 and the second ground mounting ends 94*b*.

It should thus be appreciated that the electrical cables 84 can be electrically connected to the second mounting ends 72*b* of the second electrical contacts 72. In particular, when the electrical cables 84 are configured as twin axial cables, each of the cables can be electrically connected to the mounting ends of adjacent electrical signal contacts that define a differential pair. The electrical cables 84 can each further be electrically connected to the ground plates disposed adjacent the differential signal pair. For instance, the electrical cables 84 can each further be electrically connected to the ground mounting ends of ground plates 106, described in more detail below. The ground plates 106 can be disposed adjacent to the differential signal pair. For instance, the electrical cables 84 can each further be electrically connected to the ground mounting ends disposed immediately adjacent to the respective differential signal pair. That is, no electrical contacts are disposed between the ground mounting ends and the mounting ends of the differential signal pair of signal contacts along the respective linear array.

The second mating ends 88*a* of adjacent differential signal pairs along the second linear array 87 can be separated by at least one second ground mating end 94*a* along the transverse direction T. In one example, the second mating ends 88*a* of adjacent differential signal pairs can be separated by a second ground mating end 94*a* that has a length along the transverse direction T greater than the length of the second mating ends 88*a* along the transverse direction T. Further, the second ground mating ends 94*a* can be configured as substantially planar blades. The planar blades can extend along respective planes that are oriented along the longitudinal direction L and the transverse direction T. Thus, referring also to FIGS. 2A-2F, when the first and second electrical connectors 22 and 24 are mated with each other, the second ground mating ends 94*a* are inserted between the first and second types of ground mating ends 54*a* and 54*b* of a respective one of the first linear arrays 47 of the first electrical connector 22. Otherwise stated, the ground plate 106 is inserted between the first and second types of ground mating ends 54*a* and 54*b* with respect to the lateral direction. Thus, the convex contact surfaces of the first types of ground mating ends 54*a* contact a first side of the second ground mating ends 94*a*, and the second types of ground mating ends 54*a* contact a second side of the ground mating ends 94*a* that is opposite the first side along the lateral direction A.

The second mating ends 88*a* of the signal contacts 88 can define a second convex contact surface 96, and a concavity opposite the second convex contact surface 96 with respect to the lateral direction A. When the first and second electrical connectors 22 and 24 are mated with each other, the second mating ends 88*a* of the second signal contacts 88 can mate with the first mating ends 48*a* of the first signal contacts 48 without contacting the respective grounds of either of the first and second electrical connectors 22 and 24. For instance, the convex contact surfaces of the first and second signal contacts 44 and 48 contact each other, and ride along each other to a final mated position as the first and second electrical connectors 22 and 24 are mated to each other.

Referring again to FIGS. 3A-3G, it should be appreciated that the second ground mating ends 94*a* can be disposed between immediately adjacent differential signal pairs of the second mating ends 88*a* along the transverse direction T. The term "immediately adjacent" in this context means that no additional differential signal pairs are disposed between the two pairs of immediately adjacent differential signal pairs. While the ground mating ends 94*a* can defined substantially planar blades, it should be appreciated that each of the ground mating ends 94*a* can alternatively define a respective convex contact surface and an opposed concave surface of the type described above. The term "substantially" as used herein with respect to distances and shapes recognizes that factors such as manufacturing tolerances can affect the distances and shapes.

The mounting ends 88*b* of immediately adjacent pairs of differential signal pairs can be separated from each other along the transverse direction T by at least one ground mounting end 94*b*. In one example, the mounting ends 88*b* of immediately adjacent pairs of differential signal pairs can be separated along the transverse direction by a plurality of ground mounting ends 94*b*. For instance, the mounting ends 88*b* of the signal contacts 88 can be separated by a pair of ground mounting ends 94*b*. The ground mounting ends 94*b* and the mounting ends 88*b* of the signal contacts 88 of each second linear array 87 can further be aligned with each other along the transverse direction T. Alternatively, the ground mounting ends 94*b* and the mounting ends 88*b* of the signal contacts 88 of each second linear array 87 can be offset from each other along the lateral direction A. One or both of the second mounting ends 88*b* and the second ground mounting ends 94*b* can be configured in any manner as desired, including but not limited to solder balls, press-fit tails, and j-shaped leads. Alternatively, and as described above, the first mounting ends 48*b* and the first ground mounting ends 54*b* can be configured as cable mounts that attach to respective electrical conductors and electrical grounds of an electrical cable.

As described above, the vertical contacts 72 of the second electrical connector 24 define an overall length from their mating ends 32*a* to their mounting ends 32*b*. The overall length can be shorter with respect to electrical contacts of right-angle connectors of conventional orthogonal electrical connector systems. Further, the vertical contacts 72 do not suffer from skew that is produced from right-angle electrical contacts having different lengths that define differential signal pairs when the first and second electrical connectors 22 and 24 are mated to each other. Thus, as described below, the electrical contacts 72 can operate more reliably at faster data transfer rates in orthogonal applications compared to orthogonal right-angle electrical connectors.

In one example, the overall length of the second electrical contacts 72 can be in a range between and including substantially 1 mm and substantially 16 mm. For instance, the overall length of the second electrical contacts 72 can be in a range between and including substantially 2 mm and substantially 10 mm. For example, the overall length of the second electrical contacts 72 can be in a range between and including substantially 3 mm and substantially 5 mm. In particular, the overall length of the second electrical contacts 72 can be substantially 4.3 mm.

When the first and second electrical connectors 22 and 24 are mated with each other, the respective first and second mated electrical contacts 32 and 72 can define an overall mated length along the longitudinal direction L. It is appreciated that the mating ends 32*a* and 72*a* can wipe along each other and overlap each other when the electrical contacts 32 and 72 are mated with each other. The overall mated length can be measured from the mounting ends 32*b* of the first electrical contacts 32 to the mounting ends 72*b* of the second electrical contacts. In one example, the overall mated length of the second electrical contacts 72 can be in a range between and including substantially 3 mm and substantially 20 mm. For instance, the overall mated length of the second electrical contacts 72 can be in a range between and including substantially 5 mm and substantially 20 mm. For instance, the range can be between and include substantially 5 mm and substantially 15 mm.

The second linear arrays 87 can include first, second, and third ones of the second linear arrays 87 that are adjacent to each other. The second linear arrays can be arranged such that the second one of the second linear arrays 87 is between the first and third ones of the second linear arrays 87 and immediately adjacent the first and third ones of the second linear arrays 87. Each of the first, second, and third ones of the second linear arrays 87 can include respective arrangements of differential signal pairs separated from each other by at least one ground. One of the differential signal pairs of the second one of the second linear arrays can be defined as a victim differential signal pair, and differential signals with data transfer rates of substantially 40 Gigabits/sec in six differential signal pairs in the first, second, and third ones of the second linear arrays 87 that are closest to the victim differential signal pair produce no more than six percent of worst-case, multi-active cross talk on the victim differential signal pair at a rise time in a range between and including 5 and 40 picoseconds, in one example. For instance, the data transfer rates can be in a range between and including substantially 56 Gigabits/second and 112 Gigabits/second.

It is recognized that the grounds 90 can be defined by respective ground plates 106 having the ground mating ends 94*a* and the ground mounting ends 94*b*. Alternatively, the grounds 90 can be defined by discrete ground contacts that each include respective ground mating ends and ground mounting ends.

With continuing reference to FIGS. 3A-3G, in one example the second electrical connector 24 can include a plurality of second leadframe assemblies 102 that are supported by the second connector housing 70. Each of the second leadframe assemblies 102 can include a dielectric or electrically insulative second leadframe housing 104, and a respective second linear array 87 of the plurality of second electrical contacts 72. Thus, it can be said that each leadframe assembly 102 is oriented along one of the second linear arrays 87 of the second electrical connector 24. The leadframe housing 104 can be overmolded onto the respective signal contacts 88. Alternatively, the signal contacts 88 can be stitched into the leadframe housing 104. Further, the grounds of the respective second linear array 87 can be defined by a second ground plate 106 as described above. The ground plate 106 can include a plate body 108 that is supported by the leadframe housing 104, such that the ground mounting ends 94*b* extend out from the plate body 108. The plate body 108 can define the ground mating ends 94*a*. Alternatively, the ground mating ends 94*a* can extend out from the plate body 108 along the longitudinal direction L. It should be appreciated that the plate body 108, the ground mating ends 94*a*, and the ground mounting ends 94*b* can all be monolithic with each other. Respective ones of the ground plate bodies 108 can be disposed between respective adjacent linear arrays of the intermediate regions of the electrical signal contacts 88.

Each of the leadframe assemblies 102 can define at least one aperture 111 that extends through each of the leadframe housing 104 and the ground plate 106 along the lateral direction A. The at least one aperture 111 can include a plurality of apertures 111. A perimeter of the at least one aperture 111 can be defined by a first portion 105*a* of the leadframe housing 104. The first portion 105*a* of the leadframe housing 104 can be aligned with the ground plate 106 along the lateral direction A. The leadframe housing 104 can further include a second portion 105*b* that cooperates with the first portion 105*a* so as to capture the ground plate 106 therebetween along the lateral direction A. The quantity of electrically insulative material of the leadframe housing 104 can further control the impedance of the first electrical connector 24. Further, a region of each at least one aperture 111 can be aligned with the signal mating ends 88*a* of the electrical signal contacts 88 along the longitudinal direction L.

In one example, the ground plate body 108 can include embossed regions 109 disposed in an alternating manner with a contact region 101 along the transverse direction. The contact region 101 can define the ground mating ends 94*a*. Further, the contact region 101 can define the ground mounting end 94*b*. The embossed regions 109 can be offset along the lateral direction A in a direction away from the mating ends 88*a* of the electrical signal contacts 88. At least a portion of the mating ends 88*a* of the electrical signal contacts 88 of the respective leadframe assembly 102 can be aligned with a respective one of the embossed regions 109 along the lateral direction A. For instance, respective entireties of the of the mating ends 88*a* of the electrical signal contacts 88 of the respective leadframe assembly 102 can be aligned with a respective one of the embossed regions 109 along the lateral direction A. In one example, the mating ends 88*a* of a differential signal pair can face a common one of the embossed regions 109 so as to define a gap therebetween along the lateral direction A. The mating ends of respective differential signal pairs can be aligned with respective different ones of the embossed regions 109. A dielectric can be disposed in the gap. In one example, an entirety of the gap is defined by air. In another example, at least a portion of the gap up to an entirety of the gap can include electrically nonconductive plastic or any suitable dielectric.

The embossed regions 109 can extend beyond the mating ends 88*a* with respect to the longitudinal direction L. The embossed regions 109 can include an embossed body 110 and an outer lip 113 that is offset away from the embossed body along the lateral direction A away from the respective mating ends 88*a*. The outer lips 113 can be aligned with the tips of the mating ends 88*a* along the longitudinal direction L. The grounds of the first and second electrical connectors 22 and 24 can mate with each other before the signal contacts of the first and second electrical connectors mate with each other when the first and second electrical connectors 22 and 24 are mated with each other. Conversely, the grounds of the first and second electrical connectors 22 and 24 can unmate from each other before the signal contacts of the first and second electrical connectors 22 and 24 unmate with each other when the first and second electrical connectors 22 and 24 are separated from each other.

In one example, the embossed regions 109 can face the respective concavities of the mating ends 88*a* that are opposite the second convex contact surfaces 96. Further, the embossed regions 109 can be spaced from the respective concavities along the lateral direction A. Therefore, when the mating ends of the signal contacts of the first and second electrical connectors 22 and 24 mate with each other, the mating ends 88*a* can flex toward the ground plate 106 without contacting the ground plate 106. In particular, the mating ends 88*a* can flex toward the respective embossments 109 without contacting the embossments 109. Further, when the first and second electrical connectors 22 and 24 are mated with each other, each of the ground mating ends 94*a* can be received between the pair of first type of ground mating ends 54*a* of the first electrical connector 22 (see FIG. 2F) and the second type of ground mating end 54*a* with respect to the lateral direction A. Thus, each of the blades that define the ground mating ends 94*a* can contact three separate ground mating ends of the first electrical connector 22.

When it is desired to unmate one of the first substrates 26 from the second substrates 28, an unmating force can be applied to the first substrate 26 that urges the first substrate 26 to move along the longitudinal direction L away from the second substrates 28. In this regard, the mating ends of the electrical contacts of the first and second electrical connectors 22 and 24 can define a normal force that acts against each other to resist separation of the first and second substrates 26 and 28 absent the unmating force. Accordingly, the first and second electrical connectors 22 and 24 can be devoid of respective latches that engage each other to retain the first and second electrical connectors 22 and 24 in the mated configuration when the first and second electrical connectors 22 and 24 are mated with each other.

It is recognized that the first electrical connectors 22 extend out from the first substrates 26 along the transverse direction so as to define a first height. The second electrical connectors 22 extend out from the first substrates 26 along the transverse direction T so as to define a first height. The first height can be defined by the number of electrical contacts in each of the first leadframe assemblies 62. The second height can be defined by the number of leadframe assemblies 102 in the second electrical connector 24.

Thus, a first kit of electrical connectors can include a plurality of first electrical connectors 22. Ones of the first electrical connectors 22 of the kit can have different number of differential signal pairs defined by the respective first leadframe assemblies 62 than others of the first electrical connectors of the kit. Thus, the ones of the first electrical connectors 22 can define a different height from the first substrate 26 than the others of the electrical connectors 22 when the electrical connectors are attached to respective first substrates 26. A second kit of electrical connectors can include a plurality of second electrical connectors 24. Ones of the second electrical connectors 24 of the kit can have different number of leadframe assemblies 102 than others of the second electrical connectors 24 of the second kit. Thus, the ones of the second electrical connectors 24 can define a different height from the second substrate 28 than the others of the electrical connectors 24 when the second electrical connectors 24 are attached to respective second substrates 28. It should be appreciated that a single kit can include each of the first and second kits.

It should be appreciated that the ground plate 106 can be configured to electrically shield the signal contacts 88 of the respective second linear array 87 from the signal contacts 88 of an adjacent one of the second linear arrays 87 along the lateral direction A. Thus, the ground plates 106 can also be referred to as electrical shields. Further, it can be said that an electrical shield is disposed along the lateral direction A, between adjacent ones of respective linear arrays of the electrical signal contacts 88. In one example, the ground plates 106 can be made of any suitable metal. In another example, the ground plates 106 can include an electrically conductive lossy material. In still another example, the ground plates 106 can include an electrically nonconductive lossy material.

Referring again to FIGS. 1A-1D, and as described above, the electrical contacts 32 and 72 of the first and second electrical connectors 22 and 24, respectively, can define shorter distances from their respective mating ends to their respective mounting ends compared to right-angle electrical connectors of conventional orthogonal electrical connector systems. Further, vertical contacts do not suffer from skew that is produced from right-angle electrical contacts having different lengths that define differential signal pairs. Thus, the orthogonal electrical connector system 20 can transfer data at higher speeds than conventional orthogonal electrical connector systems. For instance, the orthogonal electrical connector system 20 can be configured to transfer differential signals from the mounting ends of one of the first and second electrical connectors 22 and 24 to the mounting ends of the other of the first and second electrical connectors 22 and 24 at data transfer rates of substantially 40 Gigabits per second/sec while producing no more than six percent of worst-case, multi-active cross talk on any of the differential signal pairs of the first and second electrical connectors 22 and 24 at a rise time in a range between and including 5 and 40 picoseconds. For instance, the data transfer rates can be in a range between and including substantially 56 Gigabits per second/sec and substantially 112 Gigabits per second while producing no more than six percent of worst-case, multi-active cross talk on any of the differential signal pairs of the first and second electrical connectors 22 and 24 at a rise time that is in a range between 5 and 40 picoseconds.

The first and second electrical connectors 22 and 24 can be configured to directly mate with each other. That is, the first mating ends 32*a* of the first electrical connectors 22 are configured to directly contact the second mating ends 72*a* of the second electrical connectors 24 without passing into or through any intermediate structure, such as a midplane, an orthogonal adapter, or the like, so as to mate the first electrical connectors 22 to the second electrical connectors 24. Further, in one example, the first and second electrical connectors 22 and 24 can only mate with each other when they are oriented in a single relative orientation, such that the respective electrical contacts mate with each other in the manner described herein. Further, in one example, each of the first and second electrical connectors 22 and 24 can include only electrical signal contacts. Thus, each of the first and second electrical connectors 22 and 24 can be devoid of optical fibers and waveguides that are configured to transmit optical signals, which are commonly present in optical connectors, It should be appreciated that the plurality of first electrical connectors 22 can be arranged in groups of first electrical connectors 22. Each group of the first electrical connectors 22 can be configured to attach to a respective different one of the first substrates 26. Similarly, the plurality of second electrical connectors 24 can be arranged in groups of second electrical connectors 24. Each group of the second electrical connectors 24 can be configured to attach to a respective different one of the second substrates 28. Thus, when the first and second electrical connectors 22 are mated to each other, each of the first substrates 26 is placed in data communication with each of the second substrates 28. For instance, the first electrical connectors 22 of each group of first electrical connectors 22 can mate with a respective second electrical connector of each of the groups of second electrical connectors 24. Similarly, when the first and second electrical connectors 22 are mated to each other, each of the second substrates 28 can be placed in data communication with each of the first substrates 26. For instance, the second electrical connectors 24 of each group of second electrical connectors 24 can mate with a respective first electrical connector of each of the groups of first electrical connectors 22. The first substrates 26 can be configured as daughter cards, and the second substrates 28 can be configured as daughter cards. Thus, daughter cards defined by the first substrates 26 can be removed from data communication with the daughter cards defined by the second substrates 28 and replaced by other daughter cards as desired.

Thus, the orthogonal electrical connector system 20 can include at least one power bus bar 112. The power bus bar can be placed in electrical communication with one or more of the first substrates 26, up to all of the first substrates 26 so as to deliver electrical power to the first substrates 26. The orthogonal electrical connector system 20 can further carry one or both of electrical power and low speed signals configured to be placed in electrical communication with one or more of the first substrates 26 when the first and second electrical connectors 22 and 24 are mated with each other.

As described above, and referring to FIG. 1C, the electrical connector system 20 can include the first termination electrical connector 46 and the complementary electrical connector 49. Thus an electrical connector system 45 can include the first termination electrical connector 46, which can be referred to as a first electrical connector of the connector system 45. The connector system 45 can further include the complementary electrical connector 49, which can be referred to as a second electrical connector of the connector system 45. As described above, in one example the complementary electrical connector can be configured to be mounted to a substrate, such as the substrate 26. Thus, in one example, the connector system 45 can be referred to as a daughtercard connector system, because the complementary electrical connector 49 can be configured to be mounted onto one of the daughtercards defined by the substrates 26.

The electrical connector system 20 can further include one or more integrated circuit (IC) packages 27 supported by one or more up to all of the first substrates 26. Each IC package 27 can include a respective dedicated substrate 29 and a respective IC chip 33 mounted to the dedicated substrate 29. The IC package 27 can further include a heat sink 35 that is configured to remove heat from the IC chip 33 during operation. The dedicated substrate 29 can be configured as a printed circuit board. In some examples, the IC chip 33 can be wirebonded to the dedicated substrate 29. The dedicated substrate 29 can be supported by the first substrate 26. The complementary electrical connectors 49 can be placed in electrical communication with a respective at least one of the IC packages 27. For instance, in one example, at least one or more of the complementary electrical connectors 49 up to all of the complementary electrical connectors 49 can be mounted to the first substrate 26. The first substrate 26 can include electrical traces that are configured to place the IC package 27 in electrical communication with the electrical contacts of the complementary electrical connectors 49 that are mounted to the first substrate 26. One or more up to all of the complementary electrical connectors 49 can be configured as right angle electrical connectors and mounted to the first substrate 26 such that the mounting interface of the complementary electrical connector 49 is oriented perpendicular to the first substrate 26. Alternatively or additionally, at least one or more of the complementary electrical connectors 49 can be configured as vertical electrical connectors and mounted to the first substrate 26 such that the mounting interface of the complementary electrical connector 49 is oriented parallel to the first substrate 26.

Alternatively or additionally, one or more of the complementary electrical connectors 49 can be mounted directly to the IC package 27. For instance, the complementary electrical connectors 49 can be mounted to the dedicated substrate 29. In one example, at least one or more up to all of the complementary electrical connectors 49 can be configured as right angle electrical connectors and mounted to the respective IC packages 27 such that the mounting interface of the complementary electrical connector 49 is oriented perpendicular to one or both of the first substrate 26 and the dedicated substrate 29. Alternatively or additionally, at least one or more up to all of the complementary electrical connectors 49 can be configured as vertical electrical connectors and mounted to the IC packages 27 such that the mounting interface of the complementary electrical connector 49 is oriented parallel to one or both of the first substrate 26 and the dedicated substrate 29. Alternatively or additionally still, at least one or more up to all of the complementary electrical connectors 49 can be configured as edge card connectors and mounted to the IC packages 27 such that the edge-card connectors receive the dedicated substrate 29, thereby placing respective ones of the electrical contacts in electrical communication with the IC chip 33. The first termination electrical connectors 46 can be mated with a respective one of the complementary electrical connectors 49 so as to place the electrical cables 44 in electrical communication with the IC package 27, and in particular with the IC chip 33. It is appreciated that some of the cables 44 are not shown connected between the electrical connector 22 and the respective first termination connector 46 in FIGS. 1A-1C for the purposes of clarity in the illustration.

In one example, the complementary electrical connectors 49 can be arranged in respective groups that are placed, either directly or through the first substrate 26, in electrical communication with a respective one of the IC packages 27. Thus, a corresponding respective group of the first termination connectors 46 can be mounted to respective one of the complementary electrical connectors 49 so as to place the cables 44 in electrical communication with the respective one of the IC packages 27.

Figure 4A:
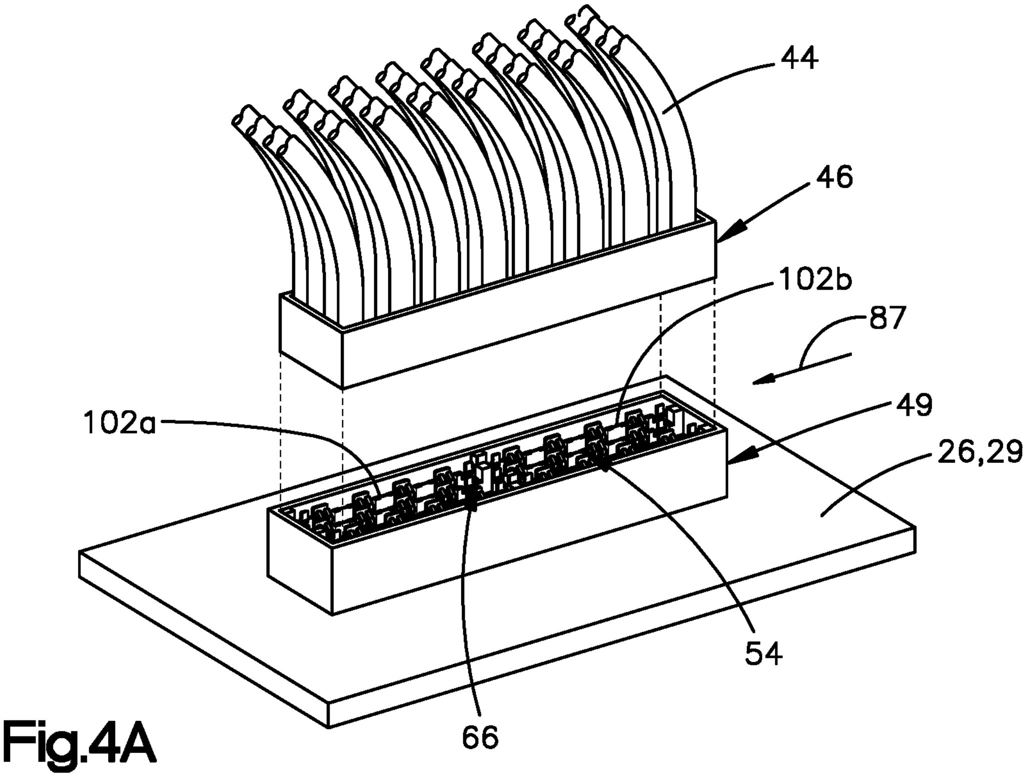
FIG. 4A is a perspective view of a connector system illustrated in FIG. 1C.
Figure 4B:
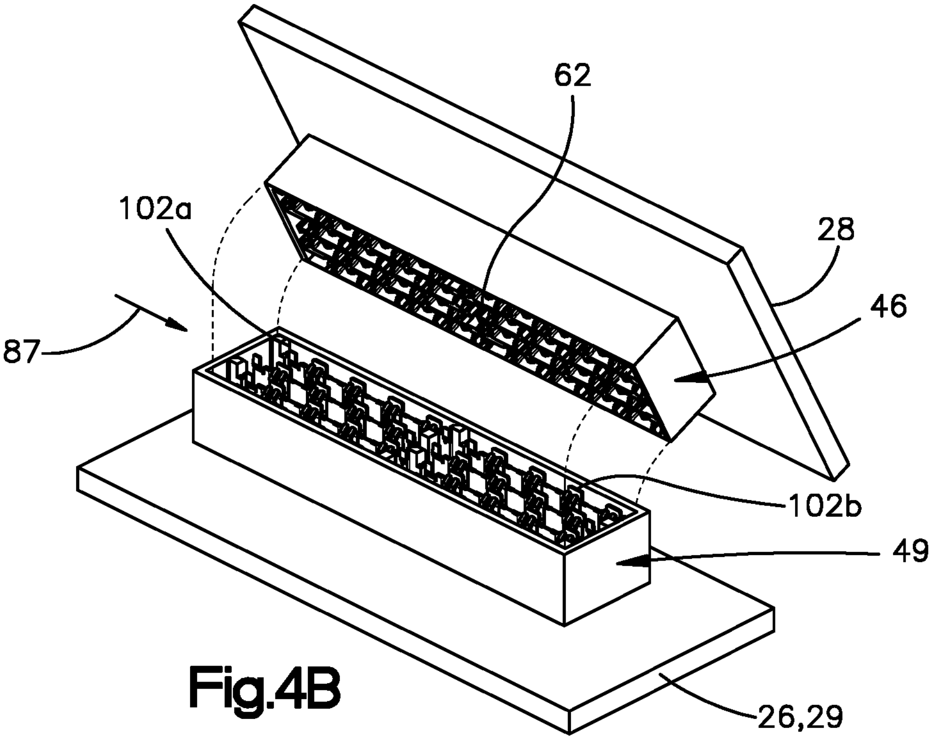
FIG. 4B is a perspective view of the connector system illustrated in FIG. 4A, but showing one of the electrical connectors mounted to a printed circuit board in accordance with an alternative embodiment.

Referring also to FIGS. 4A-4B, the complementary electrical connector 49 can be constructed as described above with reference to the second electrical connector 24. Accordingly, the complementary electrical connector 49 can be constructed as illustrated in FIGS. 3A-3F. Thus, the description of the second electrical connector 24 can apply equally to the complementary electrical connector 49, with the exception that the leadframe assemblies 102 can be split along the respective linear array 87 into first and second separate leadframe assemblies **102*a* and 102*b*. For instance, the leadframe assemblies 102 can be bifurcated along the respective linear array 87. Thus, the first and second leadframe assemblies 102*a* and 102*b* can be aligned with each other along the respective linear array, and can include an equal number of electrical contacts. Alternatively, each of the leadframe assemblies 102 can be constructed as described in FIGS. 2A-2F. Thus, the leadframe assemblies 102 can extend along an entirety of the respective linear array 87. The complementary electrical connector 49 can include the ground plates 106 that are configured to electrically shield the signal contacts 88 of the respective second linear arrays 87 from the signal contacts 48 of an adjacent ones of the second linear arrays 87 along the lateral direction A. Otherwise stated, the complementary electrical connector 49 (and the second electrical connector 24) can include electrical shielding between signal contacts along the lateral direction A. The electrical shielding can be provided by the ground plate 106**.

The first termination electrical connector 46 can be constructed as described above with reference to the first electrical connector 22. Accordingly, the first termination electrical connector 46 can be constructed as illustrated in FIGS. 2A-2F. Thus, the description of the electrical connector 22 can apply equally to the first termination electrical connector 46, with the exception that the leadframe assemblies 62 can be split along the respective linear array 47 into two separate leadframe assemblies. For instance, the leadframe assemblies 62 can be bifurcated along the respective linear array 47. Thus, the first and second leadframe assemblies can be aligned with each other along the respective linear array, and can include an equal number of electrical contacts. Alternatively, each of the leadframe assemblies 62 can be constructed as described in FIGS. 2A-2F. Thus, the leadframe assemblies 62 can extend along an entirety of the respective linear array 47. Referring also to FIGS. 2A-2F, the first termination electrical connector 46 can include the ground plates 66 that are configured to electrically shield the signal contacts 48 of the respective first linear array 47 from the signal contacts 48 of an adjacent ones of the first linear arrays 47 along the lateral direction A. Otherwise stated, the first termination electrical connector 46 (and the first electrical connector 22) can include electrical shielding between adjacent signal contacts along the lateral direction A. The electrical shielding can be provided by the ground plate 66.

Further, the at least one ground mating end **54*a* disposed between respective adjacent pairs of differential signal pairs can provide electrical isolation between the adjacent pairs of differential signal pairs. In one example, the at least one ground mating end 54*a* can include first and second ground mating ends 54*a* as described above. For instance, the at least one ground mating end 54*a* can include first, second, and third consecutively arranged mating ends 54*a* that are consecutively arranged along the transverse direction T. In this regard, it should be appreciated that the transverse direction T can define a linear array direction along which each of the first linear arrays can be oriented. In one example, the second one of the ground mating ends 54*a* can face opposite the first and third ones of the ground mating ends 54*a* with respect to the lateral direction A. Further, the first and third ones of the ground mating ends 54*a* can face the same direction as the mating ends 48*a* of the signal contacts 48 along the respective first linear array. The second ones of the ground mating ends 54*a* can further be spaced in their respective entireties from at least one or both of the first and third ones of the ground mating ends 54*a*** along the lateral direction A.

As illustrated in FIG. 4A, the first electrical connector 46 of the connector system 45 can be configured as a cable connector. Thus, as described above, the mounting ends of the signal contacts and the ground mounting ends can be mechanically and electrically connected to respective ones of electrical cables 44. The first complementary electrical connector 49 of the connector system 45 can be configured as a board connector configured to be mounted to a substrate. In one example, the substrate can be one of the first substrates 26. Alternatively, the substrate can be one of the dedicated substrates 29 of an IC package 27. Thus, in one example, the mounting ends of the signal contacts and the ground mounting ends of the first complementary electrical connector 49 can be mechanically and electrically connected to the substrate 26, which can be configured as a printed circuit board. In another example, the mounting ends of the signal contacts and the ground mounting ends of the first complementary electrical connector 49 can be mechanically and electrically connected to the dedicated substrate 29 of the IC package 27, which can be configured as a printed circuit board. It should be appreciated, of course, that the first electrical connector 46 of the connector system 45 can alternatively be mounted to one of the first substrate 26 and the dedicated substrate 29, and the second electrical connector 49 of the connector system 45 can be mounted to the cables 44.

It should be further appreciated that instead of the substrate 26, one or both of the electrical connectors 46 and 49 can be mounted to respective substrates as shown in FIG. 4B. The substrates can be oriented parallel to each other when the electrical connectors 46 and 49 are mounted to them and mated with each other. The substrates can be configured as printed circuit boards. Thus, the connector system 45 can be configured as a mezzanine connector system. It should be further appreciated that one or both of the first and second electrical connectors 46 and 49 of the connector system can alternatively be configured as right-angle connectors whereby the respective mating ends and mounting ends are oriented substantially perpendicular to each other.

It should be appreciated that while the first termination electrical connector 46 can be configured as described above with respect to the first electrical connector 22, and the complementary electrical connector 49 can be configured as described above with respect to the second electrical connector 24, the connector system 45 can alternatively be configured such that the first termination electrical connector 46 can be configured as described above with respect to the second electrical connector 24, and the complementary electrical connector 49 can be configured as described above with respect to the first electrical connector 22.

Similarly, the second termination electrical connector 83 can also be constructed as described above with respect to the first electrical connector 22. Thus, the description of the electrical connector 22 can also apply to the second termination electrical connector 83. Further, the complementary electrical connector 85 that is configured to mate with the second termination electrical connector can be constructed as described above with respect to the second electrical connector. Thus, the description of the second electrical connector can also apply to the complementary electrical connector 85. Alternatively, the second termination electrical connector 83 can also be constructed as described above with respect to the second electrical connector 24. Thus, the description of the second electrical connector 24 can also apply to the second termination electrical connector 83. Similarly, the complementary electrical connector 85 that is configured to mate with the second termination electrical connector 83 can alternatively be constructed as described above with respect to the first electrical connector 22. Thus, the description of the first electrical connector 22 can also apply to the complementary electrical connector 85.

It should be appreciated that the second termination connectors 83 can be provided in an array of second termination electrical connectors 83 that includes an outer second termination housing, and the second termination connectors 83 supported in the outer second termination housing in the manner described above. Thus, the electrical connector assembly 20 can include a plurality of arrays of second termination connectors 83. Alternatively, the second termination connectors 83 can be provided individually and mated individually to respective ones of the second complementary electrical connectors 85.

In this regard, it should be appreciated that the second complementary electrical connectors 85 can be provided in an array of second complementary electrical connectors 85 that includes an outer second complementary housing, and the second complementary connectors 85 supported in the outer second complementary housing in the manner described above. Thus, the electrical connector assembly 20 can include a plurality of arrays of second complementary connectors 85. Alternatively, the second complementary connectors 85 can be provided individually and mated individually to respective ones of the second termination electrical connectors 83.

Below, signal integrity and performance data is disclosed for one or more up to all of the electrical connectors described herein. As will be appreciated from the description below, the electrical connectors described have improved performance characteristics compared to conventional electrical connectors. It has been found that the electrical connectors can be configured to transmit data at data transfer speeds of at least 56 Gbits/sec. For instance, the connector system 45 can be configured to transmit at least 56 Gbits/sec while compliant with NRZ line code, 2) at least 112 Gbits/sec while compliant with PAM-4 line code, and 3) at least 56 Gbits/sec at a rise time between 5 and 20 picoseconds with 6% or less (or −40 dB or less) of cross talk. For example, NRZ compliance can mean differential insertion loss between 0 dB and −2 dB at operating frequencies up to 30 GHz. For instance, the differential insertion loss between 0 dB and −2 dB while transferring electrical signals at a frequency to 30 GHz. Alternatively or additionally, NRZ compliance can also mean having a differential return loss between 0 dB and −20 dB at while transferring electrical signals at a frequency up to 30 GHz. Alternatively or additionally still, NRZ compliance can mean differential near end cross talk (NEXT) between −40 and −100 while transferring electrical signals at a frequency up to 30 GHz. It should be appreciated that reference is made below to the connector system 45 in connection with performance data, the performance data can apply to any one up to all of the first electrical connector 22, the second electrical connector 24, the first termination electrical connector 46, the first complementary electrical connector 49, the second termination electrical connector 83, and the second complementary electrical connector 85, both individually and in combination with each other. The connector system 45 can be referenced herein for the purposes of clarity and convenience.

In one example, the connector system 45 can operate at low crosstalk levels for any given single contributor/aggressor. For instance, at a rise time between 5 picoseconds and 20 picoseconds, the connector system 45 can produce near-end multiactive crosstalk (NEXT) of no greater than −40 db of crosstalk in a range of operating frequency up to 40 Ghz. In one example, the connector system 45 can produce near-end multiactive crosstalk (NEXT) of no greater than −40 db of crosstalk in a range of operating frequency up to approximately 45 Ghz. Thus, it should be appreciated that the connector system 45 can produce near-end multiactive crosstalk (NEXT) of no greater than −40 db of crosstalk in a range of operating frequency up to 30 Ghz. Similarly, it should be appreciated that the connector system 45 can produce near-end multiactive crosstalk (NEXT) of no greater than −40 db of crosstalk in a range of operating frequency up to 20 Ghz.

Further, at a rise time between 5 picoseconds and 20 picoseconds, the connector system 45 can produce near-end multiactive crosstalk (NEXT) of no greater than −35 db of crosstalk in a range of operating frequency up to 50 Ghz. In one example, the connector system 45 can produce near-end multiactive crosstalk (NEXT) of no greater than −35 db of crosstalk in a range of operating frequency up to 40 Ghz. Thus, it should be appreciated that the connector system 45 can produce near-end multiactive crosstalk (NEXT) of no greater than −35 db of crosstalk in a range of operating frequency up to 30 Ghz. Similarly, it should be appreciated that the connector system 45 can produce near-end multiactive crosstalk (NEXT) of no greater than −35 db of crosstalk in a range of operating frequency up to 20 Ghz.

In another example, at a rise time between 5 picoseconds and 20 picoseconds, the connector system 45 can produce near-end multiactive crosstalk (NEXT) of no greater than 5% crosstalk in a range of operating frequency up to 40 Ghz. For instance, the connector system 45 can produce near-end multiactive crosstalk (NEXT) of no greater than 4% crosstalk in a range of operating frequency up to 40 Ghz. For example, the connector system 45 can produce near-end multiactive crosstalk (NEXT) of no greater than 3% crosstalk in a range of operating frequency up to 40 Ghz. In particular, the connector system 45 can produce near-end multiactive crosstalk (NEXT) of no greater than 2.0% crosstalk in a range of operating frequency up to 40 Ghz. In one example, the connector system 45 can produce near-end multiactive crosstalk (NEXT) of no greater than 1.0% crosstalk in a range of operating frequency up to 40 Ghz.

In another example, at a rise time between 5 picoseconds and 20 picoseconds, the connector system 45 can produce far-end multiactive crosstalk (FEXT) of no greater than −40 db of crosstalk in a range of operating frequency up to 40 Ghz. In one example, the connector system 45 can produce far-end multiactive crosstalk (FEXT) of no greater than −40 db of crosstalk in a range of operating frequency up to approximately 45 Ghz. Thus, it should be appreciated that the connector system 45 can produce far-end multiactive crosstalk (FEXT) of no greater than −40 db of crosstalk in a range of operating frequency up to 35 Ghz. Further, it should be appreciated that the connector system 45 can produce far-end multiactive crosstalk (FEXT) of no greater than −40 db of crosstalk in a range of operating frequency up to 30 Ghz. Similarly, it should be appreciated that the connector system 45 can produce far-end multiactive crosstalk (FEXT) of no greater than −40 db of crosstalk in a range of operating frequency up to 20 Ghz.

Further, at a rise time between 5 picoseconds and 20 picoseconds, the connector system 45 can produce far-end multiactive crosstalk (FEXT) of no greater than −35 db of crosstalk in a range of operating frequency up to 50 Ghz. In one example, the connector system 45 can produce far-end multiactive crosstalk (FEXT) of no greater than −35 db of crosstalk in a range of operating frequency up to 40 Ghz. Thus, it should be appreciated that the connector system 45 can produce far-end multiactive crosstalk (FEXT) of no greater than −35 db of crosstalk in a range of operating frequency up to 30 Ghz. Similarly, it should be appreciated that the connector system 45 can produce far-end multiactive crosstalk (FEXT) of no greater than −35 db of crosstalk in a range of operating frequency up to 20 Ghz.

In another example, at a rise time between 5 picoseconds and 20 picoseconds, the connector system 45 can produce far-end multiactive crosstalk (FEXT) of no greater than 5% crosstalk in a range of operating frequency up to 40 Ghz. For instance, the connector system 45 can produce far-end multiactive crosstalk (FEXT) of no greater than 4% crosstalk in a range of operating frequency up to 40 Ghz. For example, the connector system 45 can produce far-end multiactive crosstalk (FEXT) of no greater than 3% crosstalk in a range of operating frequency up to 40 Ghz. In particular, the connector system 45 can produce far-end multiactive crosstalk (FEXT) of no greater than 2.0% crosstalk in a range of operating frequency up to 40 Ghz. In one example, the connector system 45 can produce far-end multiactive crosstalk (FEXT) of no greater than 1.0% crosstalk in a range of operating frequency up to 40 Ghz.

Further, each of the electrical connectors 46 and 49 can have a high density of electrical contacts. For instance, one or each of electrical connectors 46 and 49 can include between 50 and 112 differential pairs of electrical signal contacts per square inch. In one example, one or each of electrical connectors 46 and 49 can include between 50 and 85 differential pairs of electrical signal contacts per square inch. For instance, one or each of electrical connectors 46 and 49 can include between 55 and 75 differential pairs of electrical signal contacts per square inch. In particular, one or each of electrical connectors 46 and 49 can include between 59 and 72 differential pairs of electrical signal contacts per square inch. Each of the mating ends, including ground mating ends and signal mating ends, can be spaced from each other at a pin-to-pin pitch of from approximately 0.6 mm to approximately 1.0 mm, such as from approximately 0.7 mm to approximately 0.9 mm, including approximately 0.8 mm.

Thus, the connector system 45 can define an aggregate data transfer rate from approximately 1 terabyte (TB) over a square inch area to approximately 4 TB over the square inch area, including from approximately 1.5 TB over the square inch area to approximately 3 TB over the square inch area, including from approximately 1.8 TB over the square inch area to approximately 2.3 TB over the square inch area, such as approximately 2.1 TB over the square inch area. The square inch area can be defined along a plane that is defined by a plane that is oriented normal to the respective electrical contacts.

The connector system 45 can define a mated stack height from approximately 7 mm to approximately 50 mm, such as from approximately 10 mm to approximately 40 mm, including approximately 15 mm to approximately 25 mm, including approximately 7 mm, approximately 10 mm, and approximately 20 mm.

The connector system 45 can further operate at a target impedance as desired. In one example, target impedance for the differential signal pairs can range from approximately 80 ohms to approximately 110 ohms, including from approximately 85 ohms to approximately 100 ohms, including from approximately 90 ohms to approximately 95 ohms, such as approximately 92.5 ohms.

In one example, any one or more up to all of the electrical connectors described herein can produce a differential insertion loss that is between 0 and −1 dB while transmitting electrical signals along the respective electrical signal contacts at all operating frequency op to 27 GHz. In another example, any one or more up to all of the electrical connectors described herein can produce a differential insertion loss that is between 0 and −2 dB while transmitting electrical signals along the respective electrical signal contacts at all operating frequencies op to 45 GHz.

Alternatively or additionally, any one or more up to all of the electrical connectors described herein can produce an insertion loss response that has a single pole RF response with a 3 db cutoff frequency greater than 70 GHz. Further, the insertion loss can be less than −3 db while transferring electrical signals along the electrical signal contacts at all frequencies up to 70 GHz with a flat linear phase response.

Alternatively or additionally, any one or more up to all of the electrical connectors described herein can produce a differential return loss between −15 dB and −45 dB while transferring data signals along the respective electrical signal contacts at all data transfer frequencies between 20 GHz and 45 GHz. For instance, the differential return loss can be between −30 dB and −45 dB. Further, the data transfer frequencies can be between 20 GHz and 25 GHz. For instance, the data transfer frequencies can be between 25 GHz and 30 GHz. In one example, the data transfer frequencies can be between 30 GHz and 35 GHz. For example, the data transfer frequencies can be between 35 GHz and 40 GHz. In one example, the data transfer frequencies can be between 40 GHz and 45 GHz.

Alternatively or additionally still, the differential TDR of any one or more up to all of the electrical connectors described herein at 17 picosecond rise time (10% to 90%) along the electrical signal contacts can have an impedance confined between 85 and 100 Ohms at all times from 0 picoseconds to 200 picoseconds.

Alternatively or additionally, any one or more up to all of the electrical connectors described herein can produce differential near end cross talk (NEXT) between −40 dB and −100 dB while transferring electrical signals along the respective electrical signal contacts at all frequencies up to 35 GHZ. In one example, the differential NEXT can be confined between −30 dB and −100 dB while transferring electrical signals along the respective electrical signal contacts at all frequencies between 35 GHz and 45 GHZ.

Alternatively or additionally, any one or more up to all of the electrical connectors described herein can produce differential far end cross talk (FEXT) between −40 dB and −100 dB while transferring electrical signals along the respective electrical signal contacts at all frequencies up to 30 GHZ. In one example, the differential FEXT can be confined between −30 dB and −100 dB while transferring electrical signals along the respective electrical signal contacts at all frequencies up to 45 GHZ. In another example, FEXT can be less than −40 dB frequency domain cross talk up while transmitting electrical signals along the respective electrical signal contacts at all frequencies up to 40 GHz.

Alternatively or additionally, any one or more up to all of the electrical connectors described herein can produce less than −0.5 dB of resonance while transferring electrical signals along the respective electrical signal contacts at all frequencies up to 67 GHz without any magnetic or electrical absorbing surfaces in the electrical connector. Rather, the electrical connectors can define respective grounds of the type described herein. For example, the resonance can be less than −0.4 dB. For example, the resonance can be less than −0.3 dB. For example, the resonance can be less than −0.2 dB. For example, the resonance can be less than −0.1 dB. It should be appreciated that the frequencies can be up to 30 GHz in one example. The frequencies can be up to 35 GHz in another example. The frequencies can be up to 40 GHz in another example. The frequencies can be up to 45 GHz in another example. The frequencies can be up to 50 GHz in another example. The frequencies can be up to 55 GHz in another example. The frequencies can be up to 60 GHz in another example. The frequencies can be up to 65 GHz in another example.

Alternatively or additionally, any one or more up to all of the electrical connectors described herein can define an impedance between 90 Ohms and 96 Ohms while transmitting electrical signals along the respective electrical signal contacts at all frequencies up to 40 Gigahertz at a 8.5 picosecond rise time.

It should be appreciated that in certain examples, the electrical contacts of the electrical connectors described herein are not defined as electrical contact pads or electrical contacts of a printed circuit board. Further, in some examples, it will be appreciated that the electrical connectors described herein do not include printed circuit boards. Further, while some of the electrical connectors described herein can be configured to receive an edge card, it should also be appreciated that in some examples at least some up to all of the electrical contacts described herein do not contain an edge card and similarly are not configured to receive an edge card. Such electrical connectors can be configured to transmit electrical signal contacts along the respective electrical signal contacts at 56 Gigabits/sec NRZ and 112 Gigabits/sec GBPS, with linear arrays of electrical signal contacts and ground shields disposed therebetween. For instance, the electrical connectors can include two or more parallel linear arrays of signal contacts with ground shields disposed therebetween. For instance, the electrical connectors can include three or more parallel linear arrays of signal contacts with ground shields disposed therebetween. For instance, the electrical connectors can include four or more parallel linear arrays of signal contacts with ground shields disposed therebetween. For instance, the electrical connectors can include five or more parallel linear arrays of signal contacts with ground shields disposed therebetween. For instance, the electrical connectors can include six or more parallel linear arrays of signal contacts with ground shields disposed therebetween. For instance, the electrical connectors can include seven or more parallel linear arrays of signal contacts with ground shields disposed therebetween. For instance, the electrical connectors can include eight or more parallel linear arrays of signal contacts with ground shields disposed therebetween.

It should be appreciated that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should be further appreciated that the various alternative embodiments described above with respect to one illustrated embodiment can apply to all embodiments as described herein, unless otherwise indicated.

What is claimed:

1. An orthogonal electrical connector system comprising:

a first electrical connector having an electrically insulative first connector housing and a plurality of first vertical electrical contacts supported by the first connector housing, wherein the first vertical electrical contacts define respective first mating ends and respective first mounting ends opposite the first mating ends along a longitudinal direction; and a second electrical connector having an electrically insulative second connector housing and a plurality of second vertical electrical contacts supported by the second connector housing, wherein the second vertical electrical contacts define respective second mating ends and respective second mounting ends opposite the second mating ends along the longitudinal direction, wherein the first electrical connector is configured to attach to a first substrate, the second electrical connector is configured to attach to a second substrate, and the first and second electrical connectors are configured to directly mate with each other along a mating direction such that the first substrate is oriented along a first plane, and the second substrate is oriented along a second plane that is substantially orthogonal to the first plane when the first electrical connector is attached to the first substrate, and the second electrical connector is attached to the second substrate, and wherein the mating direction is oriented along the longitudinal direction.

2. A method of using the orthogonal electrical connector system as recited in claim 1, the method comprising:

mounting the first electrical connector to the first substrate;

mounting the second vertical electrical connector to the second substrate; and mating the first and second electrical connectors directly to each other so that the first and second substrates are oriented orthogonal to each other.

3. The orthogonal electrical connector system as recited in claim 1, wherein the first connector housing defines at least one first attachment member configured to attach the first electrical connector to the first substrate.

4. The orthogonal electrical connector system as recited in claim 3, wherein the first connector housing defines a first attachment surface that carries the first attachment member, and the first mounting ends are disposed at a first mounting interface of the first connector housing that is different than the first attachment surface.

5. The orthogonal electrical connector system as recited in claim 4, wherein the first electrical connector is configured to mate with the second electrical connector along a respective mating direction, the first mating ends are disposed at a first mating interface of the first connector housing, and the first mating interface is aligned with the first mounting interface along the respective mating direction of the first electrical connector.

6. The orthogonal electrical connector system as recited in claim 5, wherein the first mating interface and the first mounting interface are oriented substantially parallel to each other, and the first attachment surface extends between the first mating interface and the first mounting interface.

7. The orthogonal electrical connector system as recited in claim 6, wherein the first attachment surface extends from the first mating interface to the first mounting interface.

8. The orthogonal electrical connector system as recited in claim 7, wherein the first mating interface and the first mounting interface are oriented along respective planes that are substantially parallel to each other, and the first attachment surface is oriented along a respective plane that is orthogonal to the planes of the first mating interface and the first mounting interface.

9. The orthogonal electrical connector system as recited in claim 1, wherein the second connector housing defines at least one second attachment member configured to attach the second electrical connector to the second substrate.

10. The orthogonal electrical connector system as recited in claim 9, wherein the second connector housing defines a second attachment surface that carries the second attachment member, and the second mounting ends are disposed at a second mounting interface of the second connector housing that is different than the second attachment surface.

11. The orthogonal electrical connector system as recited in claim 10, wherein the second electrical connector is configured to mate with the first electrical connector along a respective mating direction, the second mating ends are disposed at a second mating interface of the second connector housing, and the second mating interface is aligned with the second mounting interface along the respective mating direction of the second electrical connector.

12. The orthogonal electrical connector system as recited in claim 11, wherein the second mating interface and the second mounting interface are oriented substantially parallel to each other, and the second attachment surface extends between the second mating interface and the second mounting interface.

13. The orthogonal electrical connector system as recited in claim 12, wherein the second attachment surface extends from the second mating interface to the second mounting interface.

14. The orthogonal electrical connector system as recited in claim 13, wherein the second mating interface and the second mounting interface are oriented along respective planes that are substantially parallel to each other, and the second attachment surface is oriented along a respective plane that is orthogonal to the planes of the second mating interface and the second mounting interface.

15. The orthogonal electrical connector system as recited in claim 1, wherein the first electrical connector further comprises a plurality of leadframe assemblies that include a first leadframe housing and respective ones of the first plurality of electrical contacts, wherein the first leadframe assemblies are arranged in a plurality of first linear arrays that are oriented substantially perpendicular to the first plane and spaced from each other along a direction that is substantially parallel to the first plane.

16. The orthogonal electrical connector system of claim 1, wherein the first and second vertical electrical contacts of each of the first and second vertical electrical connectors are not defined as PCB pads or PCB contacts, and each of the first and second vertical electrical contacts comprise respective pluralities of signal contacts that are arranged along respective columns that extend in a transverse direction that is perpendicular to the longitudinal direction; and twin axial cables electrically connected to respective ones of the first and second vertical electrical contacts, wherein each of the first and second electrical connectors comprises a respective ground plate that includes a plate body and a plurality of ground mating ends and ground mounting ends that extend out from the plate body, wherein the plate body, the ground mating ends, and the ground mounting ends are all monolithic with each other, wherein the ground plate defines a plurality of recessed regions that are recessed into the plate body along a lateral direction that is perpendicular to the transverse and longitudinal directions, respective ones of the recessed regions being aligned with respective pairs of mating ends of the signal contacts of a respective one of the first and second electrical connectors along the lateral direction, wherein neither of the first and second connector housings contains or receives an edge card, and wherein the electrical cable connector is configured to transmit electrical signals at data transfer speeds of 56 gigabits/sec NRZ or 112 gigabits/sec PAM-4 signaling.

17. The method as recited in claim 2, further comprising the step of transmitting data signals from one of the mounting ends of one of the first and second electrical connectors to the mounting ends of the other of the first and second electrical connectors at data transfer rates greater than 40 Gigabits/sec while producing no more than six percent worst-case, multi-active cross talk.

18. The method as recited in claim 2, further comprising the step of transmitting data signals from one of the mounting ends of one of the first and second electrical connectors to the mounting ends of the other of the first and second electrical connectors at data transfer rates between 40 Gigabits/sec and 56 Gigabits/sec while producing no more than six percent worst-case, multi-active cross talk.

19. An array of vertical electrical connectors for use in an orthogonal electrical connector system, the array of vertical electrical connectors comprising:

an electrically insulative outer housing; and a plurality of vertical electrical connectors supported by the outer housing, each of the vertical electrical connectors including:

an electrically insulative connector housing that defines a mating interface, and a mounting interface opposite the mating interface and aligned with the mating interface along a longitudinal direction; and a plurality of vertical electrical contacts supported by the first connector housing, wherein the vertical electrical contacts define respective mating ends at the mating interface, and respective mounting ends at the mounting interface, such that the mating ends and the mounting ends of the vertical electrical contacts of each of the plurality of vertical connectors are opposite each other along the longitudinal direction;

wherein the electrically insulative outer housing is configured to attach each of the plurality of vertical electrical connectors to a substrate such that a surface of the connector housing that extends between the mating interface and the mounting interface faces the substrate along a direction that is perpendicular to the longitudinal direction.

20. The array of vertical electrical connectors as recited in claim 19, wherein each of the vertical electrical connectors further includes a plurality of electrical cables attached to respective ones of the mounting ends at one end, and configured to be placed in electrical communication with the substrate at a second end opposite the first end.

21. The array of vertical electrical connectors as recited in claim 20, wherein the electrical contacts are arranged in respective first linear arrays.

22. The array of vertical electrical connectors as recited in claim 21, wherein each of the vertical electrical connectors further comprises a plurality of leadframe assemblies supported by the connector housing, each of the leadframe assemblies comprising a leadframe housing and a respective one of the first linear arrays of electrical contacts supported by the leadframe housing, wherein the first linear arrays are oriented in respective planes that intersect the attachment surface.

23. The array of vertical electrical connectors as recited in claim 21, wherein the planes of the first linear arrays are oriented substantially orthogonal to the substrate when the vertical electrical connector is attached to the substrate.

* * * * *